(12) United States Patent
Ogawa et al.

(10) Patent No.: US 7,840,006 B2
(45) Date of Patent: Nov. 23, 2010

(54) CONTENT DISTRIBUTION SYSTEM AND CONTENT DISTRIBUTION METHOD

(75) Inventors: Akimichi Ogawa, Kanagawa (JP); Kazuhiro Shitama, Tokyo (JP); Seiji Miyama, Tokyo (JP)

(73) Assignee: Sony Corporation, Tokyo (JP)

( * ) Notice: Subject to any disclaimer, the term of this patent is extended or adjusted under 35 U.S.C. 154(b) by 1005 days.

(21) Appl. No.: 11/488,712

(22) Filed: Jul. 19, 2006

(65) Prior Publication Data

US 2007/0027812 A1 Feb. 1, 2007

(30) Foreign Application Priority Data

Jul. 29, 2005 (JP) ............................. P2005-221297

(51) Int. Cl.
*H04N 7/167* (2006.01)
(52) U.S. Cl. .......................................... 380/201; 726/7
(58) Field of Classification Search ............. 705/50–59; 380/201, 227, 228, 229, 230, 231, 232, 233, 380/277, 278, 59; 726/7
See application file for complete search history.

(56) References Cited

U.S. PATENT DOCUMENTS

| | | | | |
|---|---|---|---|---|
| 6,728,379 | B1* | 4/2004 | Ishibashi et al. | 380/278 |
| 6,834,269 | B1* | 12/2004 | Bueche | 705/56 |
| 7,158,800 | B2* | 1/2007 | Stephens et al. | 455/461 |
| 2001/0037210 | A1* | 11/2001 | Hirayama | 705/1 |
| 2001/0037378 | A1* | 11/2001 | Hirayama | 709/219 |
| 2002/0099948 | A1* | 7/2002 | Kocher et al. | 713/194 |
| 2002/0138439 | A1* | 9/2002 | Matsushima et al. | 705/52 |
| 2002/0183985 | A1* | 12/2002 | Hori et al. | 703/1 |
| 2002/0184154 | A1* | 12/2002 | Hori et al. | 705/50 |
| 2003/0105718 | A1* | 6/2003 | Hurtado et al. | 705/51 |
| 2003/0153264 | A1* | 8/2003 | Osato et al. | 455/3.06 |
| 2004/0148356 | A1* | 7/2004 | Bishop et al. | 709/206 |
| 2005/0086171 | A1* | 4/2005 | Abe et al. | 705/51 |
| 2005/0144468 | A1* | 6/2005 | Northcutt et al. | 713/189 |
| 2005/0160450 | A1* | 7/2005 | Stephens et al. | 725/35 |
| 2005/0278794 | A1* | 12/2005 | Leinonen et al. | 726/32 |
| 2006/0116890 | A1* | 6/2006 | Nakamura et al. | 705/1 |
| 2006/0212927 | A1* | 9/2006 | Riku et al. | 726/4 |
| 2006/0246914 | A1* | 11/2006 | Oswal et al. | 455/445 |
| 2007/0033416 | A1* | 2/2007 | Nonaka et al. | 713/189 |

FOREIGN PATENT DOCUMENTS

JP 2005-25922 1/2005

\* cited by examiner

*Primary Examiner*—Matthew B Smithers
*Assistant Examiner*—Abu Sholeman
(74) *Attorney, Agent, or Firm*—Finnegan, Henderson, Farabow, Garrett & Dunner, L.L.P.

(57) ABSTRACT

Disclosed herein is a content distribution system including: a content distribution server; a sender terminal; and a receiver terminal; wherein the content distribution server including a communication block; a recording block; a content management block; a content encryption block; and a key management block; wherein the sender terminal including a communication block; a terminal detection block; a recording block; and an extraction block; wherein the receiver terminal including a terminal detection block; a recording block; a decryption block; and a content reproduction block; wherein, if the sender terminal is located inside a communicable range in which data can be transmitted and received with the receiver terminal, the sender terminal distributes the content and the receiver terminal, if located inside the communicable range, reproduces the decrypted content.

12 Claims, 13 Drawing Sheets

CONTENT DISTRIBUTION SYSTEM AND CONTENT DISTRIBUTION METHOD

CROSS REFERENCES TO RELATED APPLICATIONS

The present invention contains subject matter related to Japanese Patent Application JP 2005-221297 filed in the Japanese Patent Office on Jul. 29, 2005, the entire contents of which being incorporated herein by reference.

BACKGROUND OF THE INVENTION

1. Field of the Invention

The present invention relates to a content distribution system and a content distribution method and, more particularly, to a content distribution system and a content distribution method that are capable of efficiently distributing content.

2. Description of the Related Art

Recently, along with the drastic increase in the speeds and storage capacities of the Internet and personal computers (PCs), the distribution of digital content, such as music data and video data for example, is widely practiced through networks. The content distributed from a content distribution server via networks is recorded or reproduced on a communication terminal, such as a PC, or transferred to another communication terminal, such as a portable communication terminal, to be recorded or reproduced (refer to Japanese Patent Laid-open No. 2005-25922 for example).

With the recent popularization of portable reproduction devices having wireless communication capabilities and a recording block such as hard disc drives, the distribution of digital content has come to practical use based on a network of P2P (Peer To Peer) type in which all computers in every computers in the network equally plays a role of both sever and client. In the P2P content distribution, a receiver terminal that receives the distribution of content also has a function of a sender terminal, so that music data and video data for example can be distributed more efficiently than distributing content in bulk from a particular distribution server. Also, because no particular server is arranged in the P2P configuration, the access concentration on that server can be avoided, thereby mitigating the server load.

SUMMARY OF THE INVENTION

In the past, however, the purchase of content is limited to a status in which a content distribution server holding desired content and a user terminal requesting that content are interconnected via a network. Namely, if the purchase of digital content, such as music data and video data for example, is desired, the user must connect to the network, such as the Internet, to access the content distribution server; therefore, if the user is not at his communication terminal, unable to connect to the network, the purchase of desired content cannot be achieved. This presents problems that, in terms of efficient content distribution, related-art technologies are insufficient in satisfying the user demand for content downloading.

Therefore, the present invention addresses the above-identified and other problems associated with related-art methods and apparatuses and solves the addressed problems by providing novel and improved content distribution system and content distribution method that are capable of efficiently distributing content, especially, efficiently distributing content in a status in which user communication terminals are not connected to networks.

According to an embodiment of the present invention, there is provided a content distribution system having a content distribution server for distributing content, a sender terminal for distributing content held in the content distribution server on behalf thereof, and a receiver terminal for receiving the content from the sender terminal in a wireless communication manner.

In the above-mentioned content distribution system, the content distribution server has a communication block for transmitting and receiving data with the sender terminal, a recording block for recording at least one piece of content, a content management block for managing use of content recorded to the recording block, a content encryption block for generated encrypted content by attaching at least a content reproduction restrictive condition to content recorded to the recording block, and a key management block for managing a decryption key for decrypting the encrypted content.

In the above-mentioned content distribution system, the sender terminal has a communication block for transmitting and receiving data with the content distribution server, a terminal detection block for detecting whether the receiver terminal, at least one in number, is located inside a communicable range in which the sender terminal and the receiver terminal is communicable with each other, a recording block for recording the encrypted content and the decryption key received from the content distribution server by relating the encrypted content with the decryption key, and an extraction block for extracting all or a part of the encrypted content recorded on the recording block and the decryption key related with the encrypted content.

In the above-mentioned content distribution system, the receiver terminal has a terminal detection block for detecting whether the sender terminal, at least one in number, is located inside the communicable range, a recording block for recording the encrypted content and the decryption key received from the sender terminal by relating the encrypted content with the decryption key, a decryption block for decrypting the encrypted content recorded to the recording block by use of the decryption key recorded as related with the encrypted content, and a content reproduction block for reproducing the decrypted content.

In the above-mentioned content distribution system having the above-mentioned configuration, if the sender terminal is located inside a communicable range in which data can be transmitted and received with the receiver terminal, the sender terminal distributes the content and the receiver terminal, if located inside the communicable range, reproduces the decrypted content.

In the above-mentioned content distribution system, the decrypted key received by the receiver terminal from the sender terminal is a temporary key that is deleted after the encrypted content is decrypted and the receiver terminal deletes the decrypted content after reproducing content decrypted by use of the temporary key.

In the above-mentioned content distribution system, in distributing the encrypted content, the sender terminal send sender terminal identification information for identifying the sender terminal and information associated with the content distribution server to the receiver terminal.

In the above-mentioned content distribution system, the receiver terminal transmits a purchase request to the content distribution server for purchasing the encrypted content on the basis of the information associated with the content distribution server after reproducing content decrypted by use of the temporary key and, in transmitting the purchase request, transmits encrypted content identification information for identifying the encrypted content associated with the purchase request and the sender terminal identification information to the content distribution server.

In the above-mentioned content distribution system, if the purchase request is received by the content distribution server, the content distribution server transmits a decryption key for decrypting the encrypted content associated with the purchase request to the receiver terminal on the basis of the encrypted content identification information and the sender terminal identification information.

In the above-mentioned content distribution system, after transmitting the decryption key to the receiver terminal, the content distribution server executes fee payment processing for the distribution of content executed on behalf of the content distribution server, on the basis of the encrypted content identification information and the sender terminal identification information.

In the above-mentioned content distribution system, before receiving the encrypted content, the receiver terminal obtains prepaid information that is right information for purchasing content in a predetermined number from the content distribution server and records the obtained prepaid information to the recording block of the receiver terminal.

In the above-mentioned content distribution system, the receiver terminal, after receiving the encrypted content and a decryption key corresponding to the encrypted content from the sender terminal, determines whether the prepaid information is recorded to the recording block and, if the prepaid information is found recorded to the recording block, relates the prepaid information with the encrypted content, thereby not deleting the decryption key used to decrypt the related encrypted content.

In the above-mentioned content distribution system, the receiver terminal transmits purchase log information containing encrypted content identification information associated with encrypted content related with the prepaid information and sender terminal identification information associated with a sender terminal from which the encrypted content has been distributed and, if the content distribution server receives the purchase log information, the content distribution server executes fee payment processing for the distribution of content executed on behalf of the content distribution server on the basis of the encrypted content identification information and the sender terminal identification information contained in the purchase log information.

According to embodiments of the present invention, a content distribution system and a content distribution method are provided for efficiently distributing content on the basis of P2P-type data distribution; especially, these system and method allows the purchase of content without network connection by obtaining the right for purchasing content on the side of the receiver terminal in advance.

The above and other features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
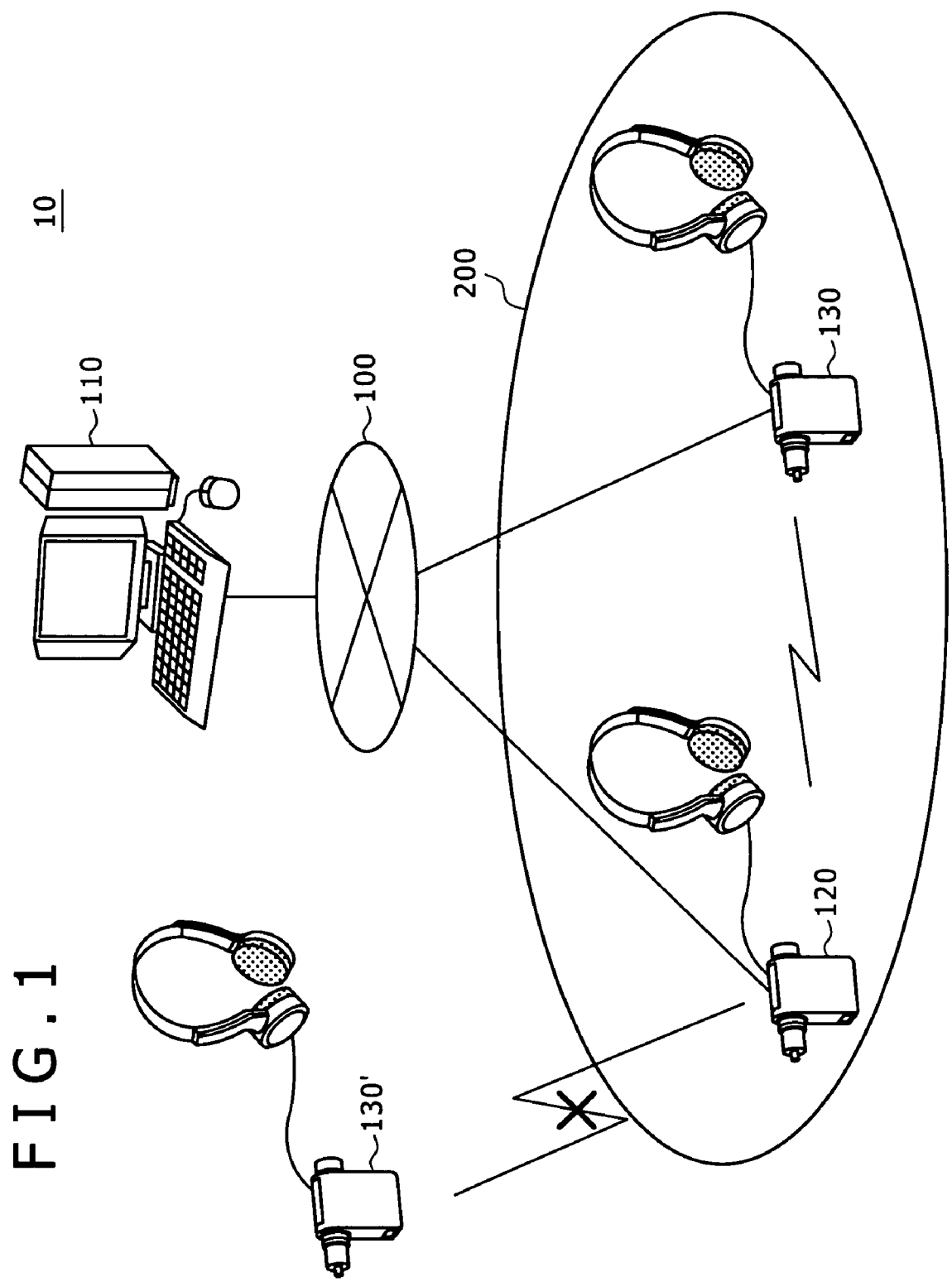
FIG. 1 is a schematic diagram illustrating an exemplary overall configuration of a content distribution system practiced as one embodiment of the present invention.

This invention will be described in further detail by way of embodiments thereof with reference to the accompanying drawings. It should be noted that, herein and drawings accompanying thereto, components having substantially the same functional configuration are denoted by the same reference numerals to avoid duplicate description.

First, a content distribution system practiced as one embodiment of the present invention will be overviewed. In the content distribution system associated with the present embodiment, in order for a seller (or a content distribution server) commissioned by a holder of content right (copyright for example) for the sale of copyrighted music and video content to distribute (and advertise) the copyright music and video content in a secure and large-scale manner, a pair of restricted content obtained by restricting part of each piece of content (such content is referred to as encrypted content) and release right information (a decryption key) for clearing that restriction is generated. Then, the registration of one or more advertisement agents (or sender terminals) that secondarily distribute the restricted content for the seller of the restricted content is subscribed. The registered advertisers secondarily distribute the restricted content to users (or receiver terminals). Users wanting to purchase the distributed restricted content request the seller for purchase (at this moment, the seller gets from the user a payment of the sold content). Next, the seller requested by the user for purchase supplies the user the release right information for clearing the restriction of the purchased restricted content. Then, the seller pays the cost of the secondary distribution to the advertiser that has distributed this restricted content. At the same time, the seller also pays a cost (a compensation for example) to the holder of the copyright of this restricted content. It should be noted that, in the above-mentioned system, the copyright holder and the seller may be the same party.

In the content distribution system having the above-mentioned configuration, the payment of price to an advertiser occurs after the conclusion of transaction between user and seller, so that the advertisement cost may be cut, thereby making this system significantly secure for sellers (or copyright holders).

Overall Configuration of Content Distribution System 10:

The following describes an overall configuration of a content distribution system 10 practiced as one embodiment of the present invention with reference to FIG. 1. FIG. 1 approximately shows the entire configuration of the content distribution system 10.

As shown in FIG. 1, the content distribution system 10 according to an embodiment of the present invention includes a content distribution server 110 for distributing one or more pieces of content held therein, a sender terminal 120 for distributing the content held by the content distribution server 110 on behalf thereof, and a receiver terminal 130 for receiving content from the sender terminal 120 in a wireless communication manner.

In the content distribution system 10 according to an embodiment of the present invention, the content distribution server 110 and the sender terminal 120 or the receiver terminal 130 are interconnected through a network 100, such as the Internet. On the other hand, the sender terminal 120 and the receiver terminal 130 are able to transmit content by wireless communication if these terminals are located inside a communicable range 200 in which the data transmission/reception by wireless communication between the terminals is allowed (for example, the sender terminal 120 is disabled to transmit/receive content by wireless communication with a receiver terminal 130' that is outside the communicable range 200).

Therefore, after the sender terminal 120 gets content from the content distribution server 110, the content distribution system 10 allows the sender terminal 120 and the receiver terminal 130 located inside the communicable range 200 to transmit/receive content (by forming a so-called ad hoc network) if the sender terminal 120 and the receiver terminal 130 are not connected to the content distribution server 110 and a network 100, such as the Internet. Thus, unlike streaming distribution, data transmission is executed only once; the second and later data transmission sessions are executed by use of the cache, thereby speeding up the start of reproduction. In addition, since the content distribution according to the present embodiment is not using streaming, the content distribution does not cause the discontinuation of audio or video data during reproduction.

Further, the content distribution system 10 is adapted to execute the content distribution of P2P (Peer To Peer) type. Namely, receiving content from the sender terminal 120 as described above, the receiver terminal 130 can play a role of the sender terminal and transmit content to other receiver terminals. Thus, the content distribution system 10 is able to efficiently distribute content. Unlike networks in which access is concentrated on only one server, the content distribution system 10 has many servers to prevent access concentration, thereby mitigating network band load. Details of the content distribution method in the content distribution system 10 will be described later.

It should be noted that the sender terminal 120 may exist in the plural for one content distribution server 110 and the receiver terminal 130 may exist in the plural for one sender terminal 120. Thus, plural sender terminals 120 or receiver terminals 130 allow the distribution (or delivery) in a wider range.

Figure 2:
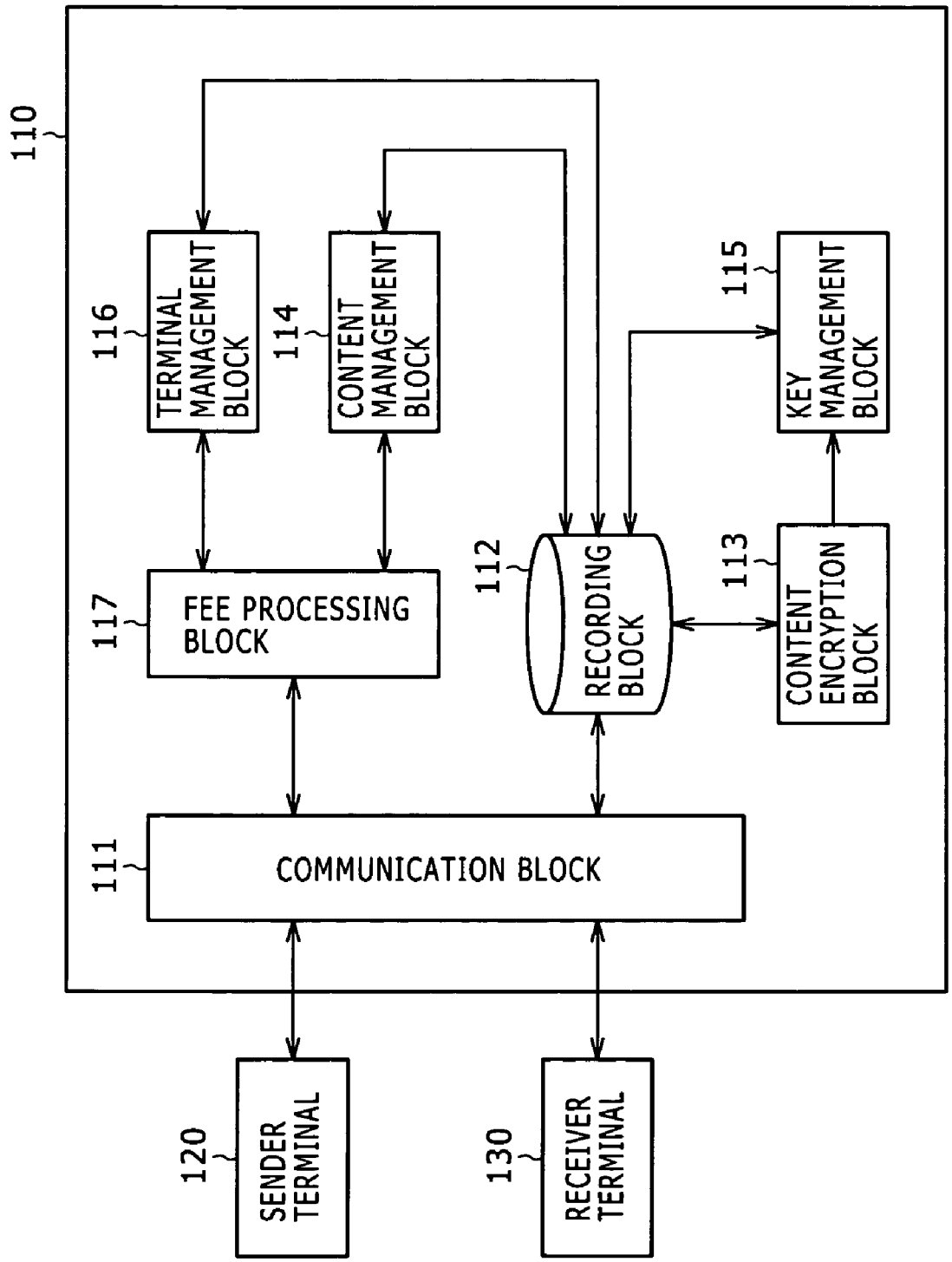
FIG. 2 is a block diagram approximately illustrating an exemplary configuration of a content distribution server associated with the above-mentioned embodiment.

Configuration of Content Distribution Server 110:

The following describes the content distribution server 110 according to an embodiment of the present invention with reference to FIG. 2. FIG. 2 is a block diagram showing an approximate configuration of the content distribution server 110 according to an embodiment of the present invention.

As shown in FIG. 2, the content distribution server 110 mainly has a communication block 111, a recording block 112, a content encryption block 113, a content management block 114, a key management block 115, a terminal management block 116, and a fee processing block 117.

The communication block 111 transfers data with the sender terminal 120 or the receiver terminal 130 connected via the network 100. Through this communication block 111, the content distribution server 110 transmits encrypted content from the recording block 112 to the sender terminal 120 and a decryption key from the recording block 112 to the receiver terminal 130 upon purchase request.

In the recording block 112, one or more pieces of content (for example, music data and video data) are stored in advance. The content stored in the recording block 112 is one of which right (copyright for example) is owned by the content distribution server 110 itself or was legally turned over from the holder of the right of that content by means of sale commission for example.

The content encryption block 113 generates a pair of encrypted content obtained by attaching at least a restriction condition for content reproduction to the content stored in the recording block 112 and a decryption key for decrypting this encrypted content. The encrypted content and the decryption key generated by the content encryption block 113 are related with each other and recorded to the recording block 112.

The encrypted content as referred to in the present embodiment denotes the content at least attached with a content reproduction restrictive condition as described above; for example, content that is reproducible only for a certain period of time (the first 30 seconds for example) after the start of reproduction, music content that is reproducible only a bridge part, content that is reproducible only for a certain number of times (three times for example), content degraded in quality (resolution for example), and content that is disabled for reproduction. The decryption key as referred to in the present embodiment denotes data having a capability of clearing the above-mentioned restrictive conditions (key and serial numbers for example).

The content management block 114 manages the use (recording, reproduction, and deletion, for example) of the encrypted content generated by the content encryption block 113. For example, the encrypted content recorded to the recording block 112 is allocated with an ID for the identification thereof and the content management block 114 manages the encrypted content ID by relating it with the decryption key for decrypting the encrypted content and a sender terminal ID for identifying the sender terminal 120 that distributes, on behalf of the content distribution server 110 the encrypted content.

The key management block 115 manages the use (recording, deletion, and so on) of the decryption key generated by the content encryption block 113. For example, the encryption key is allocated with an ID for the identification thereof and the key management block 115 manages the decryption key by relating the decryption ID with a corresponding encrypted content ID and the ID of the sender terminal 120 that distributes, on behalf of the content distribution server 110, the encrypted content. It should be noted that decryption keys in the present embodiment are generated for all sender terminals 120, so that different IDs are allocated these decryption keys.

The terminal management block 116 manages information associated with the sender terminal 120 that distributes, on behalf of the content distribution server 110, the encrypted content generated by the content encryption block 113. For example, an ID is allocated to the sender terminal 120 that distributes the above-mentioned encrypted content on behalf of the content distribution server 110 and the terminal management block 116 manages the sender terminal ID by relating it with the ID of the encrypted content to be distributed by this sender terminal and the ID of the corresponding decryption key.

It should be noted that, although not shown, if the content distribution server 110 is a seller that is commissioned by a content right holder for the sale of content, the content distribution server 110 may have a right holder management block (not shown) for managing the information (ID for example) associated with the right holder.

If content held in the content distribution server 110 is purchased by the receiver terminal 130, the fee processing block 117 executes fee payment processing for the agency of content distribution on the sender terminal 120 on the basis of the encrypted content ID associated with the purchased content and the sender terminal ID of the sender terminal 120 that has distributed this encrypted content. Also, if the content distributed by the sender terminal 120 is one that was legally transferred from the right holder of that content, the fee processing block 117 executes fee payment processing for that right holder.

It should be noted that the fees to be paid by the content distribution server 110 are not limited to money; for example, the right information for purchasing given content (point awards by which a piece of content may be purchased, for example) may also be used.

Figure 3:
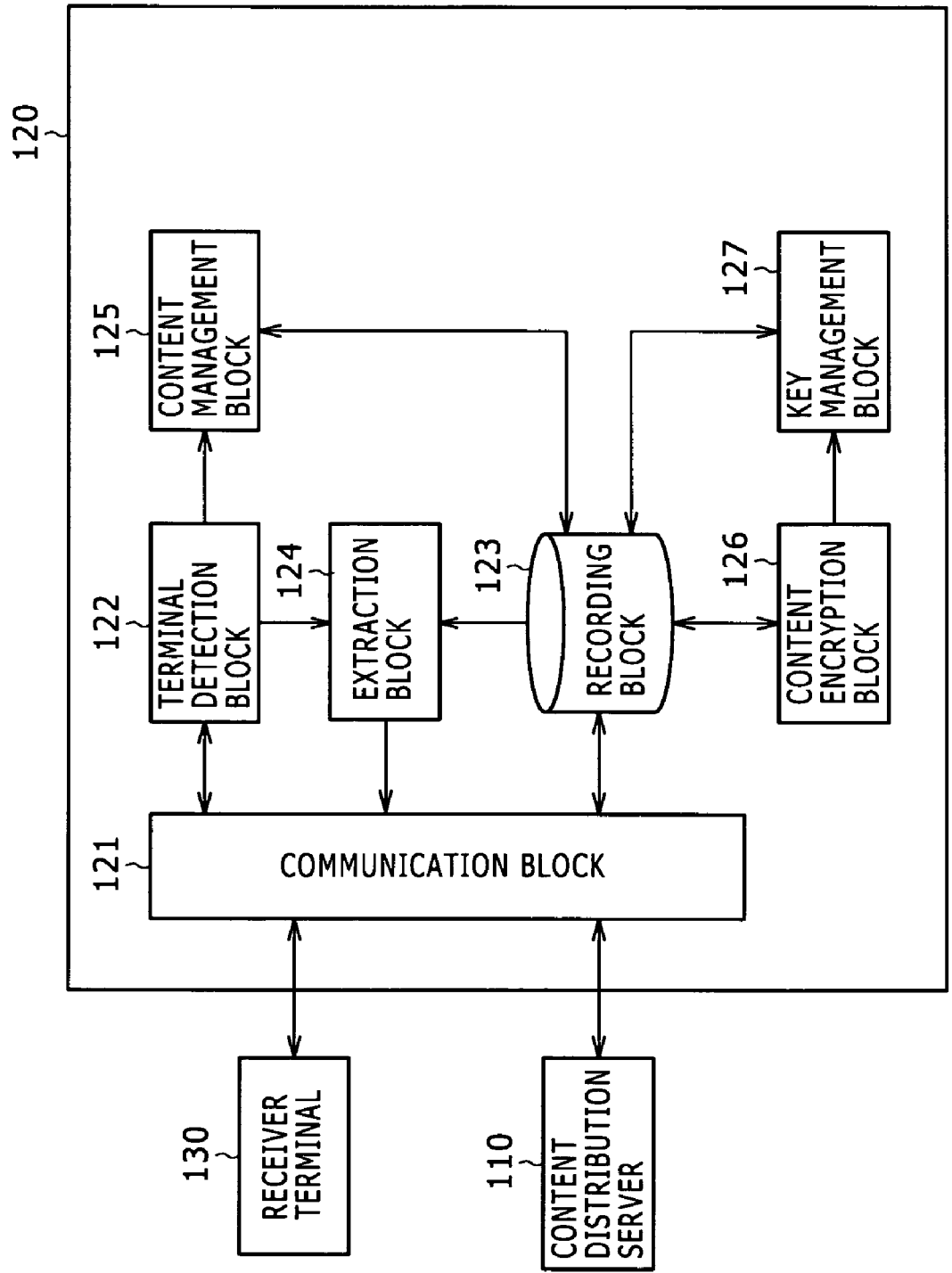
FIG. 3 is a block diagram approximately illustrating an exemplary configuration of a sender terminal associated with the above-mentioned embodiment.

Configuration of Sender Terminal 120:

The following describes a configuration of the sender terminal 120 practiced as one embodiment of the present invention with reference to FIG. 3. FIG. 3 is a block diagram showing an approximate configuration of the sender terminal 120.

As shown in FIG. 3, the sender terminal 120 mainly has a communication block 121, a termination detection block 122, a recording block 123, an extraction block 124, a content management block 125, a content encryption block 126, and key management block 127.

The communication block 121 wirelessly transfers data with the receiver terminal 130 located in the communicable range 200 and with the content distribution server 110 via the network 100. Through the communication block 121, the sender terminal 120 transmits encrypted content from the recording block 123 to the receiver terminal 130 and requests the content distribution server 110 for the transmission of encrypted content and a corresponding decryption key. It should be noted that the communication block 121 has modulation/demodulation capabilities for mutually converting wireless signals and electrical signals.

The terminal detection block 122 detects whether there is at least one receiver terminal 130 in the communicable range 200 in which wireless data transmission/reception is enabled. If at least one receiver terminal 130 is found in the communicable range 200, then the terminal detection block 122 transmits the information thereof to the extraction block 124. It should be noted that, only when the terminal detection block 122 detects the receiver terminal 130 in the communicable range 200, the communication block 121 can transmit content from the recording block 123.

The recording block 123 relates the encrypted content received from the content distribution server 110 with the corresponding decryption with and records the content and key to itself. In addition, the recording block 123 may record unencrypted content (for example, content purchased by the sender terminal 120 and content created by the sender terminal 120). However, encrypted content and unencrypted content are separately recorded.

In response to a request from the receiver terminal 130 or on the basis of detection information supplied from the terminal detection block 122, the extraction block 124 automatically extracts all or a part of the encrypted content and the decryption key corresponding thereto from the recording block 123. The content may be extracted by any standard, such as the content associated with a request by the receiver terminal 130, the content recommended by sender terminal 120, and the content ranked high in the number of times the sender terminal 120 has transmitted content, for example. The encrypted content and the decryption key extracted by the extraction block 124 are transmitted from the communication block 121 to the receiver terminal 130.

The content management block 125 manages the use (recording, reproduction, deletion, and so on) of content recorded to the recording block 123. For example, the encrypted content recorded to the recording block 123 is allocated with an ID for the identification. The content management block 125 manages the encrypted content ID by relating it with the decryption key for decrypting the encrypted content and the information (for example, server information, IP address, URL, and so on) associated with the content distribution server 110 holding that encrypted information.

In transmitting unencrypted content from the recording block 123 to the receiver terminal 130, the content encryption block 126 generates the encrypted content obtained by encrypting the unencrypted content and a decryption key for decrypting the encrypted content. However, the content encryption block 126 need not always be arranged on the sender terminal 120; if only encrypted content is recorded to the recording block 123 or unencrypted content is not transmitted to the receiver terminal 130, then the content encryption block 126 need not be arranged.

The key management block 127 manages the use (recording, reproduction, deletion, and so on) of decryption keys recorded to the recording block 123. For example, each decryption key recorded to the recording block 123 is allocated with an ID for the identification. The key management block 127 manages the decryption ID by relating it with the corresponding encrypted content ID and the information (for example, server information, IP address, URL, and so on) associated with the content distribution server 110 holding the encrypted content.

It should be noted that, although not shown, the sender terminal 120 may includes an input block and a display block, for example. If an input block and a display block are arranged, a list of encrypted content transmittable to the receiver terminal 130 is shown on the display block and the user can choose, through the input block, the encrypted content to be transmitted to the receiver terminal 130.

Figure 4:
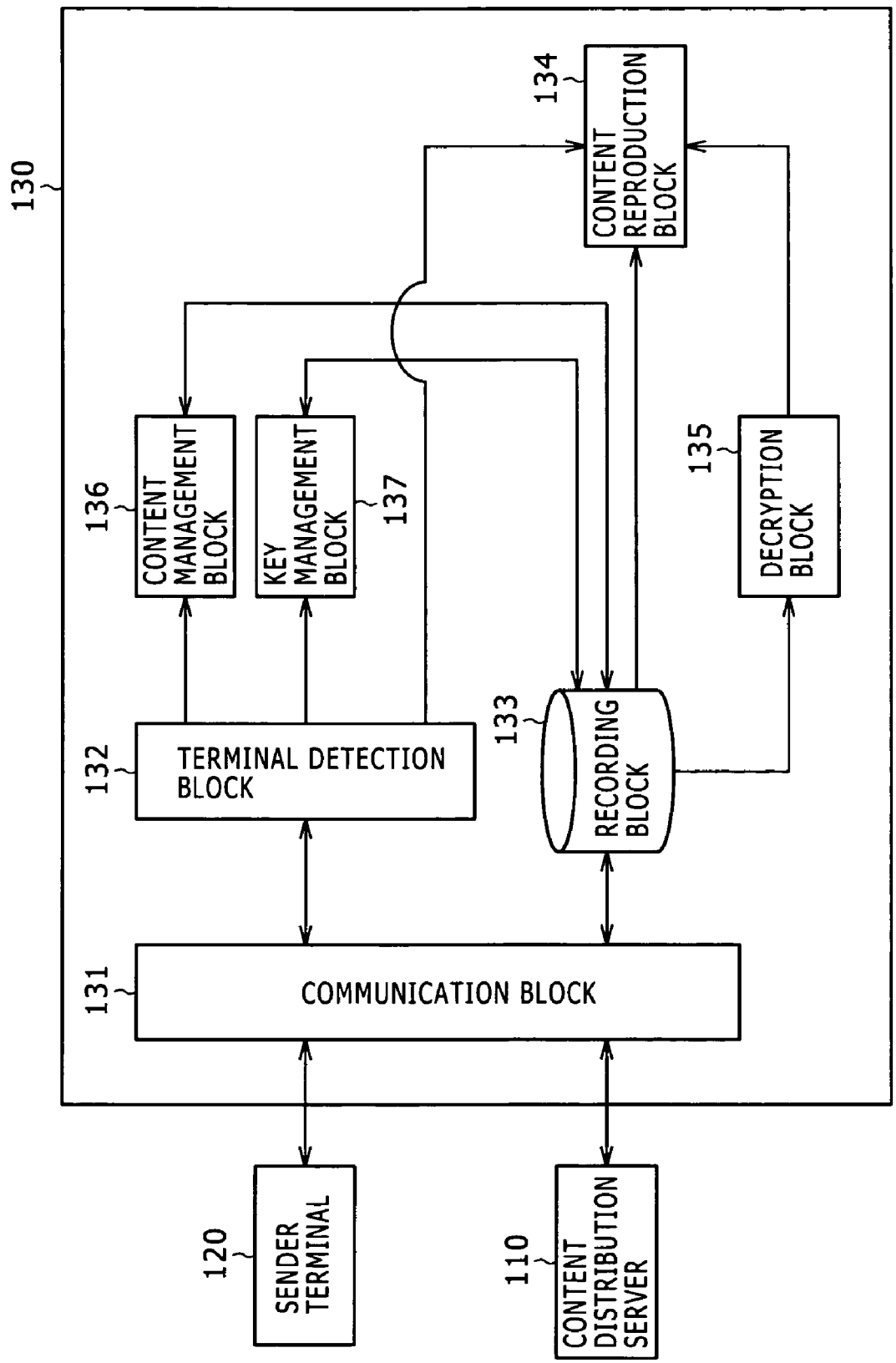
FIG. 4 is a block diagram approximately illustrating an exemplary configuration of a receiver terminal associated with the above-mentioned embodiment.

Configuration of Receiver Terminal 130:

The following describes a configuration of the receiver terminal 130 practiced as one embodiment of the present invention with reference to FIG. 4. FIG. 4 is a block diagram showing an approximate configuration of the receiver terminal 130.

As shown in FIG. 4, the receiver terminal 130 has a communication block 131, a terminal detection block 132, a recording block 133, a content reproduction block 134, a decryption block 135, a content management block 136, and a key management block 137.

The communication block 131 wirelessly transfers data with the sender terminal 120 located in the communicable range 200 and transfers data with the content distribution server 110 via the network 100. The receiver terminal 130 receives encrypted content and a corresponding decryption key from the communication block 131 through the sender terminal 120 and requests the content distribution server 110 for the purchase of decryption key. It should be noted that the communication block 131 has modulation/demodulation capabilities for mutually converting wireless signals and electrical signals.

The terminal detection block 132 detects whether there is at least one sender terminal 120 in the communicable range 200 in which wireless data transmission/reception is enabled. If at least one sender terminal 120 is found in the communicable range 200, then the terminal detection block 132 transmits the information thereof to the content reproduction block 134.

The recording block 133 relates the encrypted content received from the sender terminal 120 with the corresponding decryption key and records the content and key to itself. In addition, the recording block 123 may record unencrypted content (for example, content purchased by the receiver terminal 130 from the content distribution server 110 and content created by the receiver terminal 130). However, encrypted content and unencrypted content are separately recorded.

The content reproduction block 134, upon reception of information that the sender terminal 120 is found in the communicable range 200, reproduces the content distributed from the sender terminal 120 and recorded to the recording block 133. At this moment, if the content received from the sender terminal 120 and recorded to the recording block 133 is encrypted content, then this content is decrypted by the decryption block 135 to be reproduced by the content reproduction block 134.

If the content recorded to the recording block 133 is encrypted content, the decryption block 135 decrypts the encrypted content by use of the corresponding decryption key. If the decryption key is one obtained from the content distribution server 110, then this decryption key is deleted after use.

The content management block 136 manages the use (recording, reproduction, deletion, and so on) of the content recorded to the recording block 133. For example, the encrypted content recorded to the recording block 133 is allocated with an ID for the identification. The content management block 136 manages the encrypted content ID by relating it with a corresponding decryption key for decrypting the encrypted content and information (for example, server information, IP address, URL, and so on) associated with the content distribution server 110 holding the encrypted content.

The key management block 137 manages the use (recording, reproduction, deletion, and so on) of the decryption key recorded to the recording block 133. For example, each decryption key recorded to the recording block 133 is allocated with an ID for the identification. The key management block 137 manages the decryption key ID by relating it with the encrypted content ID corresponding to the decryption key ID and the information (for example, server information, IP address, URL, and so on) associated with the content distribution server 110 holding the encrypted content. In addition, if the decryption key used for decrypting the encrypted content is one obtained from the content distribution server 110, then the key management block 137 deletes this decryption key after use.

It should be noted that, although not shown, the receiver terminal 130 may includes an input block and a display block, for example. If an input block and a display block are arranged, a list of encrypted content recorded to the recording block 133 is shown on the display block and the user can choose, through the input block, the encrypted content to be reproduced. In addition, if the decryption key corresponding to the selected encrypted content is not recorded to the recording block 133, then a message for example telling that content cannot be reproduced unless decryption is made is shown on the display block.

Figure 5:
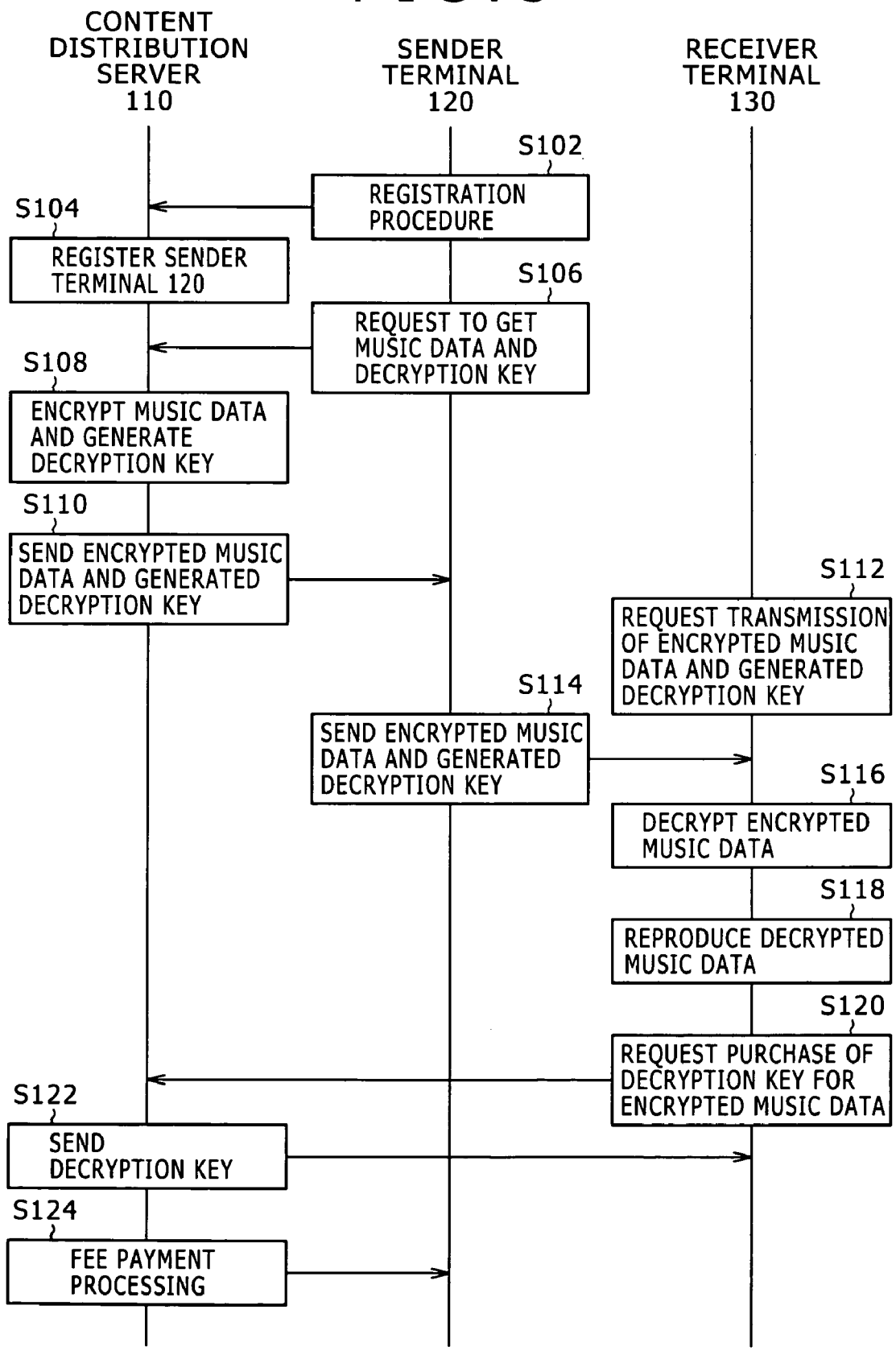
FIG. 5 is a timing chart indicative of a content distribution method in the above-mentioned content distribution system.

Content Distribution Method in the Content Distribution System 10:

The following describes a content distribution method in the content distribution system 10 practiced as one embodiment of the present invention with reference to FIG. 5. FIG. 5 shows a timing chart for describing the content distribution method in the content distribution system 10.

As shown in FIG. 5, in the content distribution method practiced as one embodiment of the present invention, the sender terminal 120 executes a registration procedure for getting an account for distributing content such as music and video for example owned by the content distribution server 110 to the receiver terminal 130 on behalf of the content distribution server 110 (step S102). In the registration procedure, the sender terminal 120 transmits information including the name, address, telephone number, bank account number, and so on of the sender terminal 120 to the content distribution server 110.

The sender terminal 120 executes the above-mentioned registration procedure via the Internet for example to get the account in the content distribution server 110, so that the sender terminal 120 can get content such as music data for example from the content distribution server 110.

Examination is carried out in the above-mentioned registration procedure. If the examination is successful, then the sender terminal 120 is ready for using services provided by the content distribution server 110. For these services, the content distribution server 110 can provide the sender terminal 120 through the Internet the browsing and selection of music data for advertisement, the browsing of advertisement activity result information, the setting of the payment of the cost for advertisement activities, the payment of the cost of advertisement activities, the browsing of fee payment periods, and the change and update of personal and/or organization information, for example.

Figure 6:
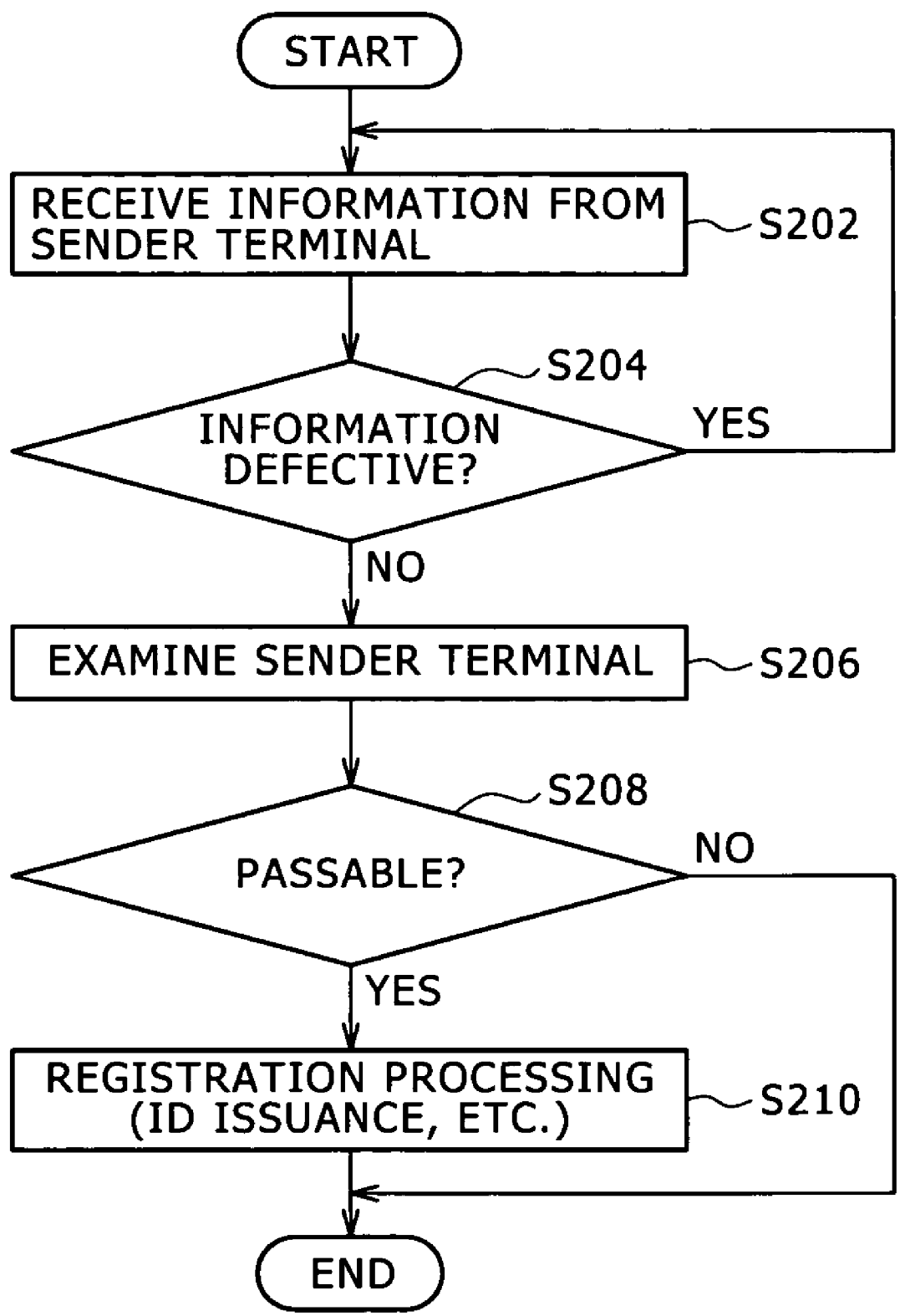
FIG. 6 is a flowchart indicative of sender terminal registration processing in the above-mentioned content distribution method.

The following details the above-mentioned registration processing with reference to FIG. 6. FIG. 6 is a flowchart for describing the registration processing to be executed by the sender terminal 120 in the content distribution method practiced as one embodiment of the present invention.

As shown in FIG. 6, the content distribution server 110 receives such information associated with the sender terminal 120 as name, address, telephone number, and bank account number for example from the sender terminal 120 (step S202). Next, the content distribution server 110 determines whether the above-mentioned information is defective or not (step S204). If the information is found incomplete, then the content distribution server 110 notifies the sender terminal 120 thereof and receives the information from the sender terminal 120 again (step S202). On the other hand, if the information is found complete, the content distribution server 110 carries out an examination whether to give an account to the sender terminal 120 (step S206). If the content distribution server 110 determines that the sender terminal 120 has passed the examination, registration processing is executed, issuing an account (an ID and so on), for example. On the other hand, if the content distribution server 110 determines that that the sender terminal 120 has not passed the examination, then the registration procedure comes to an end without carrying out registration processing.

If the content distribution server 110 is a seller commissioned by the content right holder for the sale of content, then the registration of that right holder is also executed in the content distribution server 110. Details of this registration processing are substantially the same as that of the sender terminal 120, so that the description thereof will be skipped.

The right holder gets the account of the content distribution server 110 to be ready for commissioning the sale of content. If the right holder passes the examination for registration, services provided by the content distribution server 110 becomes available for the right holder. For these services, the content distribution server 110 is able to provide the right holder a sale summation browsing capability, a capability of browsing the summation of fees payable to the right holder, a capability of browsing results for each sender terminal, the assignment and suspension of sale right to a particular sender terminal, the setting of a fee payment method, the payment of fees, the browsing of fee payment period, the change and update of personal and/or organization information.

The following continues the description of the above-mentioned content distribution method practiced as one embodiment of the present invention with reference to FIG. 5 again. In the following description, music data is used as an example of content; however the content associated with the present embodiment is not limited to music data.

If, as a result of the above-mentioned registration procedure (step S102), the content distribution server 110 has registered the sender terminal 120 (step S104), the sender terminal 120 becomes ready for requesting the content distribution server 110 for music data and a decryption key for decrypting the music data as described above. Then, the communication block 121 of the sender terminal 120 connects to the Internet to request the content distribution server 110 for encrypted music data and the corresponding decryption key (step S106). In response to the request, the content encryption block 113 of the content distribution server 110 encrypts the requested music data. The decryption key for decrypting the encrypted music data is generated for each sender terminal 120. In the present embodiment, every sender terminal 120 is allocated with a unique ID and the key management block 127 manages the relationship between the decryption key and each sender terminal 120 on the basis of this uniquely allocated ID.

Next, the communication block 111 of the content distribution server 110 transmits the encrypted music data and decryption key (or temporary key) thereof generated in step S108 to the sender terminal 120 (step S110). Thus, the content distribution server 110 can get the encrypted music data for advertisement and the decryption key (or the temporary key). Then, by repeating the procedure of steps S106 through S110, the sender terminal 120 can accumulate two or more pieces of encrypted music data in the recording block 123 in advance.

If the terminal detection block 132 of the receiver terminal 130 detects that the sender terminal 120 is located inside the communicable range 200, the communication block 131 of the receiver terminal 130 wirelessly requests the sender terminal 120 for the transmission of the encrypted music data and the decryption key thereof (step S112). In response to the request, the communication block 121 of the sender terminal 120 transmits the requested encrypted music data and decryption key thereof to the receiver terminal 130 (step S114).

Next, the decryption block 135 of the receiver terminal 130 decrypts the encrypted music data received from the sender terminal 120, by use of the received decryption key (step S116). It should be noted that the decryption key used for the decryption of the encrypted music data is deleted by the key management block 137 after use.

Further, the content reproduction block 134 of the receiver terminal 130 reproduces the music data decrypted in step S116 (step S118). The reproduction of the decrypted music data can be executed only when the receiver terminal 130 and the sender terminal 120 are located inside the communicable range 200. When any of the receiver terminal 130 and the sender terminal 120 gets outside the communicable range 200, the reproduction ends immediately or the decrypted music data is deleted by the content management block 136 after reproduction.

Figure 7:
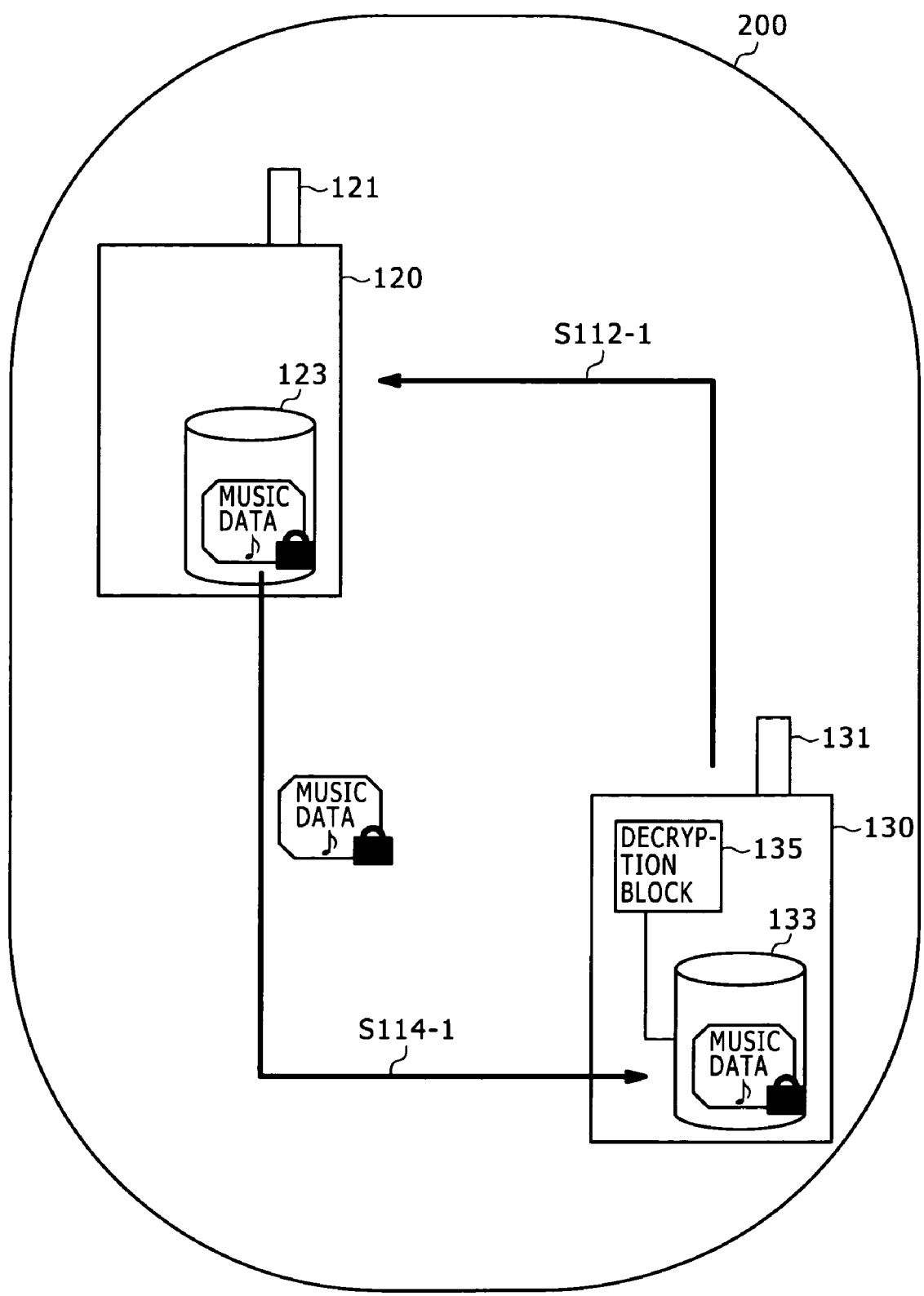
FIG. 7 is a block diagram illustrating encrypted content distribution processing associated with the above-mentioned embodiment.
Figure 8:
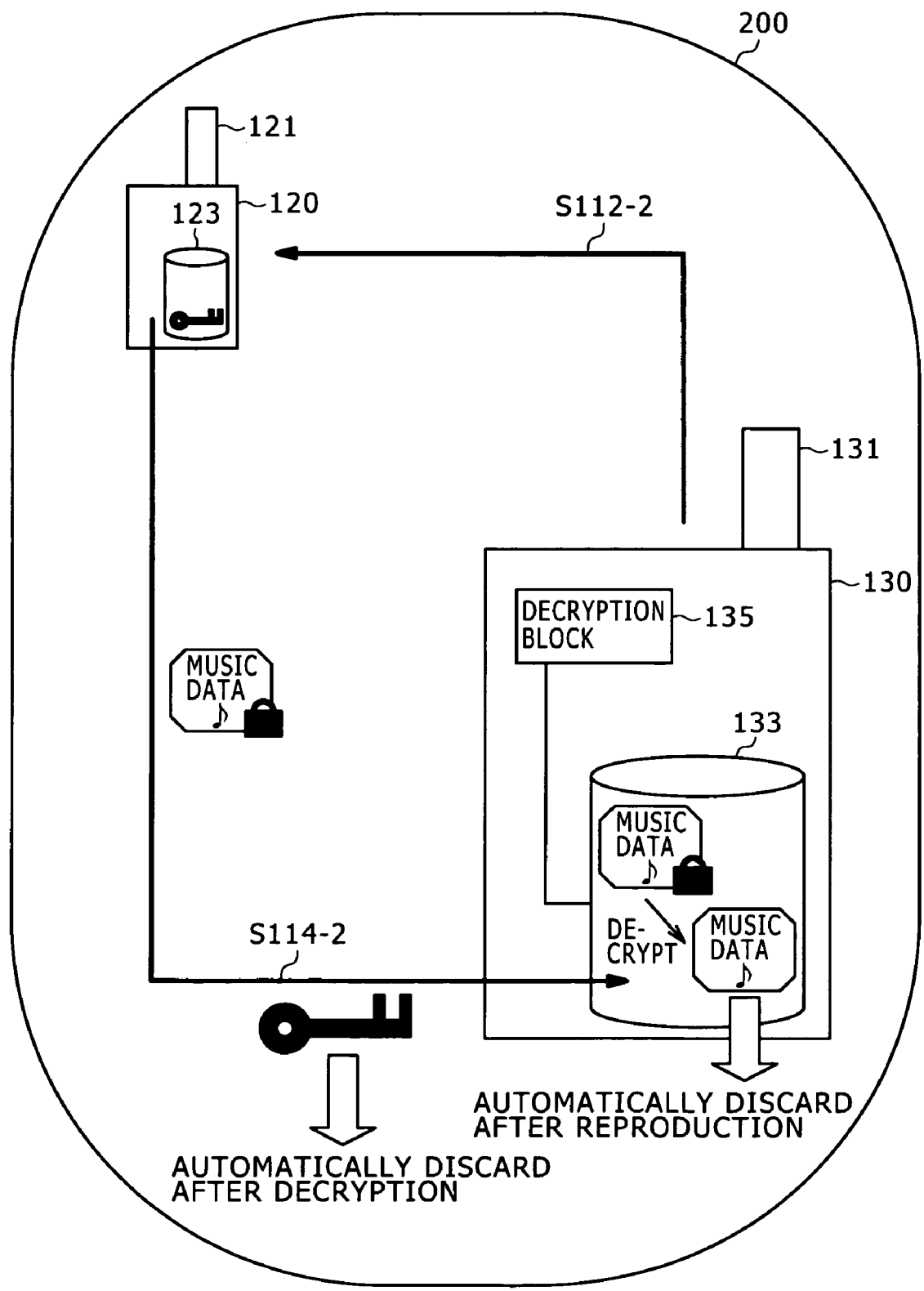
FIG. 8 is a block diagram illustrating description key distribution processing and encrypted content decryption processing associated with the above-mentioned embodiment.
Figure 9:
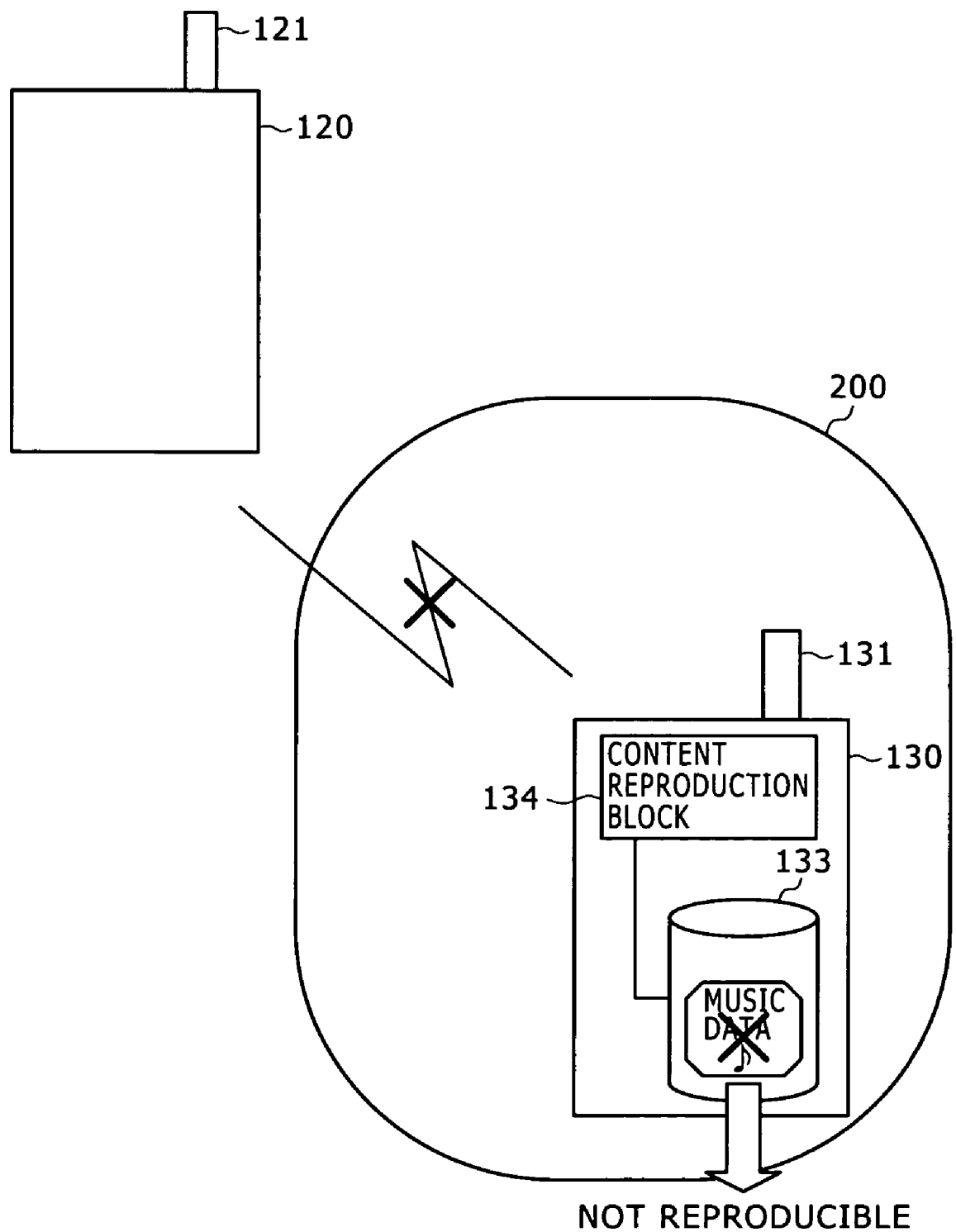
FIG. 9 is a block diagram illustrating content reproduction processing associated with the above-mentioned embodiment.

The following details the processing flow from the request by the receiver terminal 130 for content distribution to the reproduction of requested content (steps S112 through S118) with reference to FIGS. 7 through 9. FIG. 7 is a block diagram showing encrypted content distribution processing associated with the present embodiment. FIG. 8 is a block diagram showing decryption key distribution processing and encrypted content decryption processing associated with the present embodiment. FIG. 9 is a block diagram showing content reproduction processing associated with the present embodiment.

First, as shown in FIG. 7, if both the sender terminal 120 and the receiver terminal 130 are located inside the communicable range 200, then the receiver terminal 130 wirelessly transmits a music data transmission request to the sender terminal 120 (step S112-1). It should be noted that a communication path based on the above-mentioned wireless capability is encrypted.

It should also be noted that the receiver terminal 130 can also have a capability of determining whether, in accordance with the remaining power supply, to transmit the music data transmission request to the sender terminal 120.

Next, in response to the above-mentioned transmission request from the receiver terminal 130, the sender terminal 120 transmits the encrypted music data from the communication block 121 to the receiver terminal 130 (step S114-1). In this transmission, the sender terminal 120 can also transmit sender terminal identification information (ID) for identifying the sender terminal 120 and information (for example, server information, IP address, URL, and so on) associated with the content distribution server 110 to the receiver terminal 130. These items of information will later be necessary for the receiver terminal 130 to request the content distribution server 110 for the purchase of decryption key (step S120 in FIG. 5).

It should be noted that the sender terminal 120 can choose between automatic response and manual response to the request from the receiver terminal 130. Also, if automatic response is chosen, the sender terminal 120 can have a capability of automatically switching from automatic response to manual response in accordance with remaining power supply.

The sender terminal 120 may also be configured to reject the connection from a particular receiver terminal 130. For a method of the rejection, a deny list may be used, for example.

Further, it may be configured such that, by responding by the sender terminal 120 to a music data transmission request from the receiver terminal 130, the sender terminal 120 that provided that music data can be physically identified by the receiver terminal 130. For this identification, a method may be used in which a LED for example arranged for a part or all of the sender terminal 120 is driven in response to each request from the receiver terminal 130, another method in which an audio output block arranged on the sender terminal 126 is driven in response, or still another method in which the sender terminal 120 is vibrated in response, for example.

On the other hand, in order to prevent malicious use of the capability of identifying the sender terminal 120, the sender terminal 120 can invalidate this capability by responding a request from the receiver terminal 130. For example, if the method of identifying the sender terminal 120 is implemented by a LED arranged on a side surface of earphones, people nearby may easily be identified in such a packed space as a crowded train car. Therefore, in order to prevent the malicious use of this identification capability, the sender terminal 120 that does not desire the use of this capability can turn off the LED driving capability.

Also, if not physically identifiable, the receiver terminal 130 may be adapted to measure the intensity of radio wave transmitted from the sender terminal 120 to estimate the direction in which the sender terminal 120 is located, for example.

On the other hand, it may also be configured that the user of the sender terminal 120 is notified of each request from the receiver terminal 130 in a manner of audio or video. To be more specific, an audio output block of the receiver terminal 130 is sounded or a display block of the receiver terminal 130 shows a text message such as "Music data has been requested from terminal XX" for example.

Having received the encrypted music data from the sender terminal 120 at the communication block 131 as described above, the receiver terminal 130 stores the received music data into the recording block 133.

To reproduce the received encrypted music data, the receiver terminal 130 requests the sender terminal 120 for the transmission of a decryption key for decrypting the encrypted music data (step S112-1).

In response to the request from the receiver terminal 130, the sender terminal 120 transmits the decryption key from the communication block 121 to the receiver terminal 130 (step S114-2). Receiving the decryption key at the communication block 131, the receiver terminal 130 causes the decryption block 135 to decrypt the encrypted music data recorded to the recording block 133 by use of the received decryption key. This decryption key is automatically deleted after use. The decrypted music data is also automatically invalidated or deleted after reproduction.

Therefore, for the receiver terminal 130 to reproduce encrypted music data again, the receiver terminal 130 have to get a decryption key from the sender terminal 120 again; however, as with getting encrypted music data, the receiver terminal 130 can get a decryption key only when the sender terminal 120 is located inside the communicable range 200. Namely, the receiver terminal 130 can reproduce encrypted music data only when the sender terminal 120 that has transmitted the encrypted music data from the recording block 133 is located inside the communicable range 200.

The receiver terminal 130 can reproduce the decrypted music data only when the sender terminal 120 that supplied the encrypted music data from the recording block 133 is located inside the communicable range 200. Therefore, as shown in FIG. 9, if the sender terminal 120 gets outside the communicable range 200, wireless communication is disabled between the receiver terminal 130 and the sender terminal 120, thereby disabling the content reproduction block 134 to reproduce content. However, a piece of music (music data) of which reproduction started in the receiver terminal 130 while the sender terminal 120 was located inside the communicable range 200 of the receiver terminal 130 may continue the reproduction if the sender terminal 120 gets out of the communicable range 200 during reproduction until the end of the music is reached. Obviously, it is also practicable to discontinue the music immediately after the sender terminal 120 gets out of the communicable range 200.

The above-mentioned processing may be implemented by any one of the following three methods, for example.

In a first method, TCP connection is provided between the receiver terminal 130 and the sender terminal 120. The receiver terminal 130 downloads encrypted music data and a decryption key thereof from the sender terminal 120. Then, the downloaded music data can be reproduced only while the TCP connection is on. When the TCP connection is cleared, the receiver terminal 130 deletes or invalidates the decryption key. In this case, the encrypted music data is held undeleted, but the reproduction data obtained by decrypting the encrypted music data being deleted. It is also practicable to delete or invalidate the encrypted music data on the receiver terminal 130 side.

In a second method, the receiver terminal 130 downloads encrypted music data from the sender terminal 120 and then the receiver terminal 130 can reproduce the downloaded music data only while an ARP entry associated with the sender terminal 120 exists; if the ARP entry disappears, the receiver terminal 130 deletes or invalidates the decryption key used. In this case, as with the first method, the encrypted music data is held undeleted, but the reproduction data obtained by decrypting the encrypted music data being deleted. It is also practicable to delete or invalidate the encrypted music data on the receiver terminal 130 side.

In a third method, the sender terminal 120 broadcasts around wireless packets such as beacon at certain time intervals in advance. The receiver terminal 130 downloads encrypted music data and a decryption key thereof from the sender terminal 120 and then can reproduce the downloaded music content only while wireless packets can be received from that sender terminal 120; when wireless packets cannot be received from that sender terminal 120, the receiver terminal 130 deletes or invalidates the decryption key. As with the above-mentioned methods, the encrypted music data is held undeleted, but the reproduction data obtained by decrypting the encrypted music data being deleted. It is also practicable to delete or invalidate the encrypted music data on the receiver terminal 130 side.

It should be noted that, in each of the above-mentioned three methods, if both the receiver terminal 130 and the sender terminal 120 are located inside the communicable range 200 again after the deletion or invalidation of the decryption key (for example, if TCP connection is provided again, an ARP entry appears again, or it becomes ready for receiving wireless packets from the sender terminal 120 again), the reproduction can be continued by downloading only the decryption key from the sender terminal 120 or validating the downloaded decryption key again.

Thus, encrypted music data can be decrypted and reproduced only when the receiver terminal 130 is located inside the communicable range 200 of the sender terminal 120, so that the illegal copying of content and the distribution of illegally copied content can be prevented if content distribution is executed in a P2P manner as with the content distribution system 10 practiced as one embodiment of the present invention, thereby significantly enhancing the efficiency of copyright protection.

It should be noted that it is preferable in view of copyright protection not to have, in both hardware and software approaches, capabilities of reproducing and copying to other devices the deleted music data and decryption key or, if these capabilities are provided, not to have these capabilities made public, thereby excluding the possibility of allowing malicious users to practice these illegal acts. To achieve this purpose in transferring music data from a PC to a music player by USB and deleting music data, only a data input terminal may be arranged on the music player with no data output terminal arranged or a HDD arranged in a terminal may be firmly fixed thereto to prevent forcible detachment therefrom, for example.

As long as two or more receiver terminals 130 are located inside the communicable range 200 of the sender terminal 120, the above-mentioned novel configuration do not prevent such substantial pleasure of listening and viewing of music and video as sharing content such as music data and video data with many unspecified people. For example, the above-mentioned novel configuration allows the sharing of substantial pleasure of music and video in a train, in a classroom, or in a package tour, possibly producing the encounter or association with people having common interests.

Figure 10:
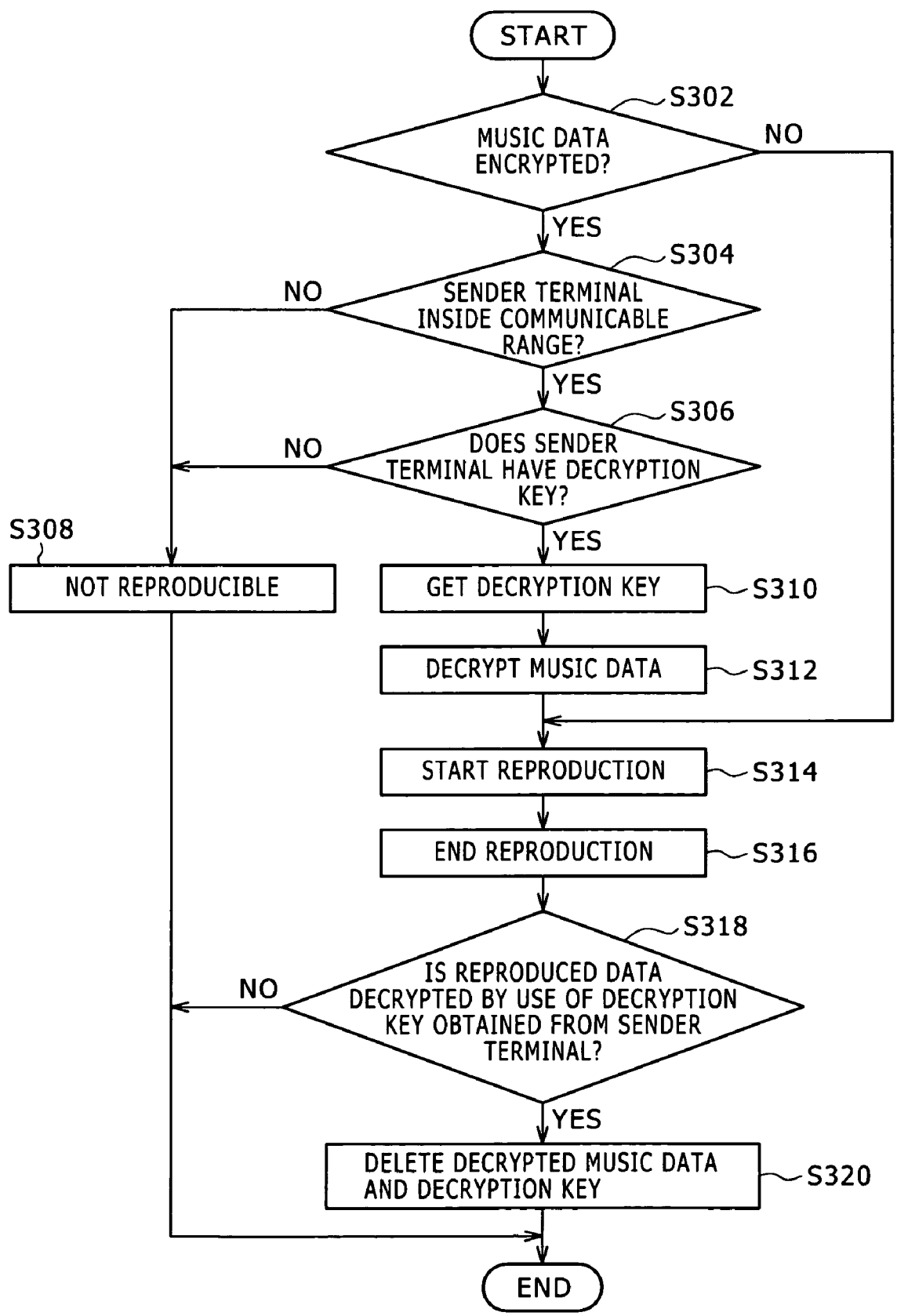
FIG. 10 is a flowchart indicative of content reproduction processing in the above-mentioned receiver terminal.
Figure 11:
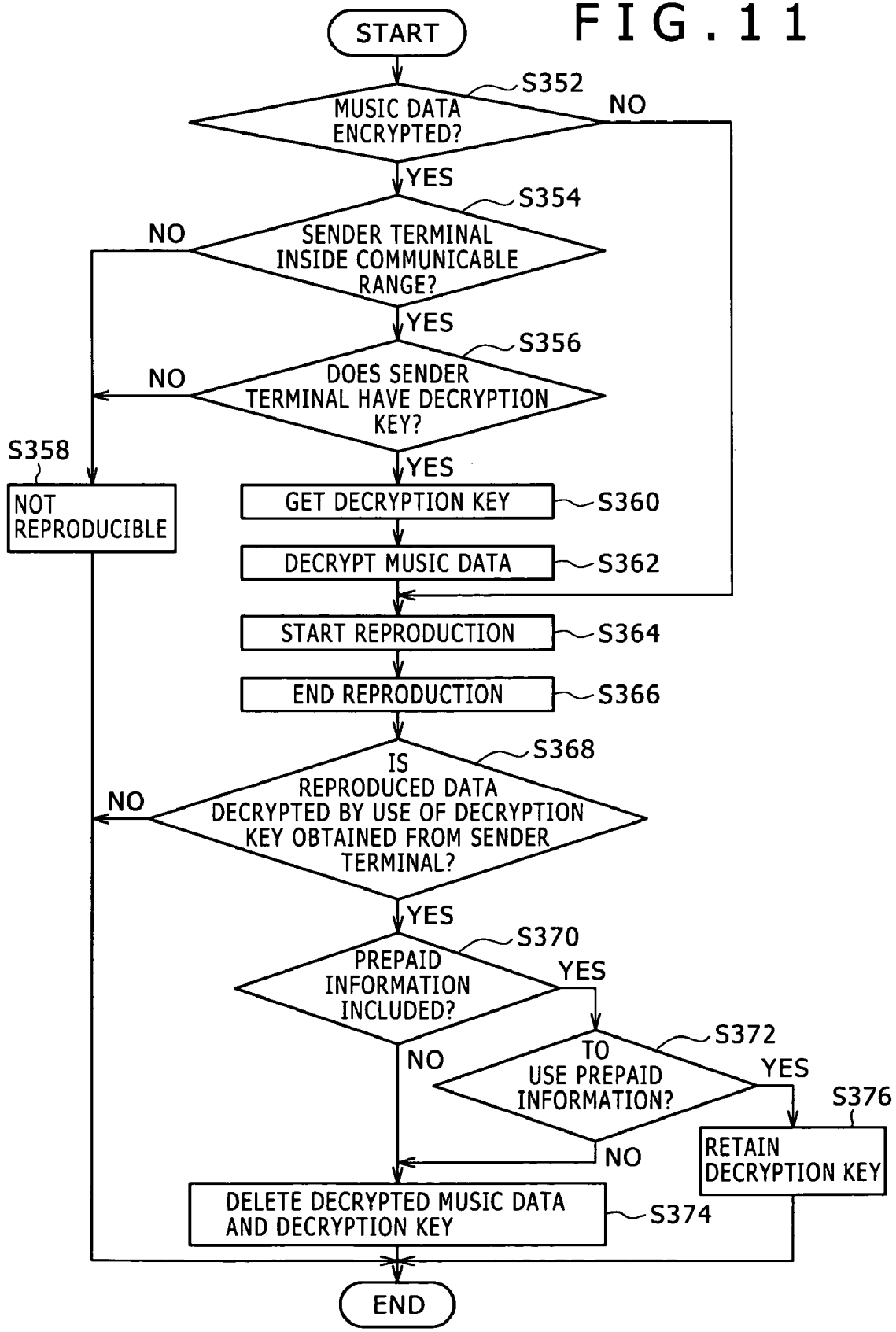
FIG. 11 is a flowchart indicative of content reproduction processing in a receiver terminal practiced as a variation to the above-mentioned embodiment.

The following details content reproduction processing (step S118) to be executed in the receiver terminal 130 practiced as one embodiment of the present invention with reference to FIGS. 10 and 11. FIG. 10 is a flowchart indicative of content reproduction processing to be executed in the receiver terminal 130 practiced as one embodiment of the present invention. FIG. 11 is a flowchart indicative of content reproduction processing to be executed in the receiver terminal 130 practiced as a variation to the above-mentioned embodiment.

As shown in FIG. 10, before reproducing music data on the receiver terminal 130, the content management block 136 determines whether the music data to be reproduced is encrypted or not (step S302).

If the music data is found not encrypted (for example, if the music data has been purchased or created by the receiver terminal 130), the reproduction of the music starts immediately (step S314). On the other hand, if the music data is found encrypted (for example, if the music data has been downloaded from the sender terminal 120), the terminal detection block 132 determines whether the sender terminal 120 that has transmitted the encrypted music data is located inside the communicable range 200 (step S304).

If no sender terminal 120 is found located in the communicable range 200, then the content reproduction block 134 cannot reproduce the content (step S308). On the other hand, if the sender terminal 120 is found located inside the communicable range 200, the terminal detection block 132 determines whether the sender terminal 120 has a decryption key for decrypting the music data to be reproduced, namely, the decryption key for decrypting the encrypted music data to be reproduced is recorded to the recording block 123 (S306). To be more specific, the receiver terminal 130 enquires the sender terminal 120 therefore.

If the sender terminal 120 is found having no decryption key, then the receiver terminal 130 cannot get the decryption key, so that the content reproduction block 134 cannot reproduce the music data (step S308). On the other hand, if the sender terminal 120 is found having the decryption key, then the receiver terminal 130 gets the decryption key from the sender terminal 120 (step S310) and decrypts the encrypted music data through the decryption block 135 by use of the obtained decryption key (step S312). Further, the receiver terminal 130 start the reproduction of the music data decrypted by the content reproduction block 134 (step S314). After the reproduction of the content (step S316), the reproduced music data is checked if the reproduction music data is one that was decrypted by use of the decryption key obtained from the sender terminal 120 (step S318).

If the reproduced music data is found decrypted by use of the decryption key obtained from the sender terminal 120, the decrypted key used and the decrypted music data are deleted (step S320), upon which the reproduction processing ends. At this time, the encrypted music data may be stored without deletion. Reproduction of encrypted music data have to acquire the decryption key from the sender terminal 120 again. If the encrypted music data is transferred to another receiver terminal, no illegal copy thereof can be made on that terminal, causing no copyright violation problem. Obviously, the encrypted music data may be deleted without storing. On the other hand, if the music data is found not decrypted by use of the decryption key obtained from the sender terminal 120, the reproduction processing ends without deleting the decryption key.

The variation to the present embodiment is an example in which prepaid information that is the right information for the receiver terminal 130 to purchase content by a predetermined number from the content distribution server 110 has been obtained in advance. As shown in FIG. 11, steps S352 through S368 are substantially the same as steps S302 through S318 shown in FIG. 10, so the detail description thereof will be skipped. The following details the processing of steps S368 and on.

In step S368, if the reproduced music data is found decrypted by use of the decryption key obtained from the sender terminal 120, then it is determined whether the receiver terminal 130 has prepaid information that is the right information for purchasing content by a predetermined number, namely, prepaid information is recorded to the recording block 133 of the receiver terminal 130 (step S370).

If the receiver terminal 130 is found having no prepaid information, then the decryption key and the decrypted music data are deleted (sep S374), upon which the reproduction processing ends. On the other hand, if the receiver terminal 130 is found having prepaid information, the receiver terminal 130 can choose to use or not to use the prepaid information (step S372). To be more specific, at the end of the reproduction of the decrypted music data on the receiver terminal 130, the user is prompted audibly or visually to choose or not to choose the purchase of the music data reproduced by use of the prepaid information, for example. The prompting method may be one in which the audio output block of the receiver terminal 130 sounds a prompting tone or the display block thereof shows a text message such as "The music has been reproduced. Do you want to buy this music?" for example. If the receiver terminal 130 chooses not to use the prepaid information, the decryption key and the decrypted music data are deleted (step S374), upon which the reproduction processing ends. On the other hand, if the receiver terminal 130 chooses to use the prepaid information, the decryption key is stored in the recording block 133 (step S376), upon which the reproduction processing ends.

Continued in what follows is the description of the content distribution method associated with the present embodiment with reference to FIG. 5 again. When the music data decrypted by the above-mentioned processing has been reproduced (step S118), the receiver terminal 130, having deleted the decryption key, becomes almost always ready for reproduction of the encrypted music data by purchasing the corresponding decryption key from not only the sender terminal 120 but also the content distribution server 110 holding that encrypted music data and the decryption key. "Almost always ready for reproduction" denotes that encrypted music data is reproducible if the sender terminal 120 is not located in the communicable range 200.

To be more specific, if the receiver terminal 130 that has deleted the decryption key desires the reproduction of encrypted music data again, the receiver terminal 130 requests the content distribution server 110 for the purchase of a decryption key corresponding to the encrypted music data to be reproduced (step S120) through the Internet. At this moment, the receiver terminal 130 transmits, along with the purchase request, the ID of the sender terminal 120 that transmitted the music data associated with the purchase request and the ID for identifying the encrypted music data. These items of information become necessary when the content distribution server 110 executes fee payment processing on the sender terminal 120.

Next, in response to the purchase request by the receiver terminal 130, the content distribution server 110 transmits the decryption key to the receiver terminal 130 via the Internet (step S122). Receiving the decryption key, the receiver terminal 130 pays a fee for the received decryption key to the content distribution server 110. Thus, the receiver terminal 130 can execute the procedure of "purchase" of the encrypted music data received from the sender terminal 120, thereby producing the encrypted music data even if the sender terminal 120 is not located in the communicable range 200.

Next, on the basis of the ID of the sender terminal 120 that has transmitted the music data associated with the purchase request transmitted from the receiver terminal 130 and the ID for identifying the encrypted music data, the content distribution server 110 calculates the fee to be paid to the sender terminal 120 and so on that has transmitted the music data associated with the purchase, thereby executing fee payment processing (step S124).

As described above, the fee is paid to the sender terminal 120 that distributes content on behalf of the content distribution server 110, leading to the distribution of content by the sender terminal 120 in a positive manner. In addition, the receiver terminal 130 becomes able to play the role of the sender terminal 120 and therefore get paid for, thereby distributing content more efficiently and widely.

Figure 12:
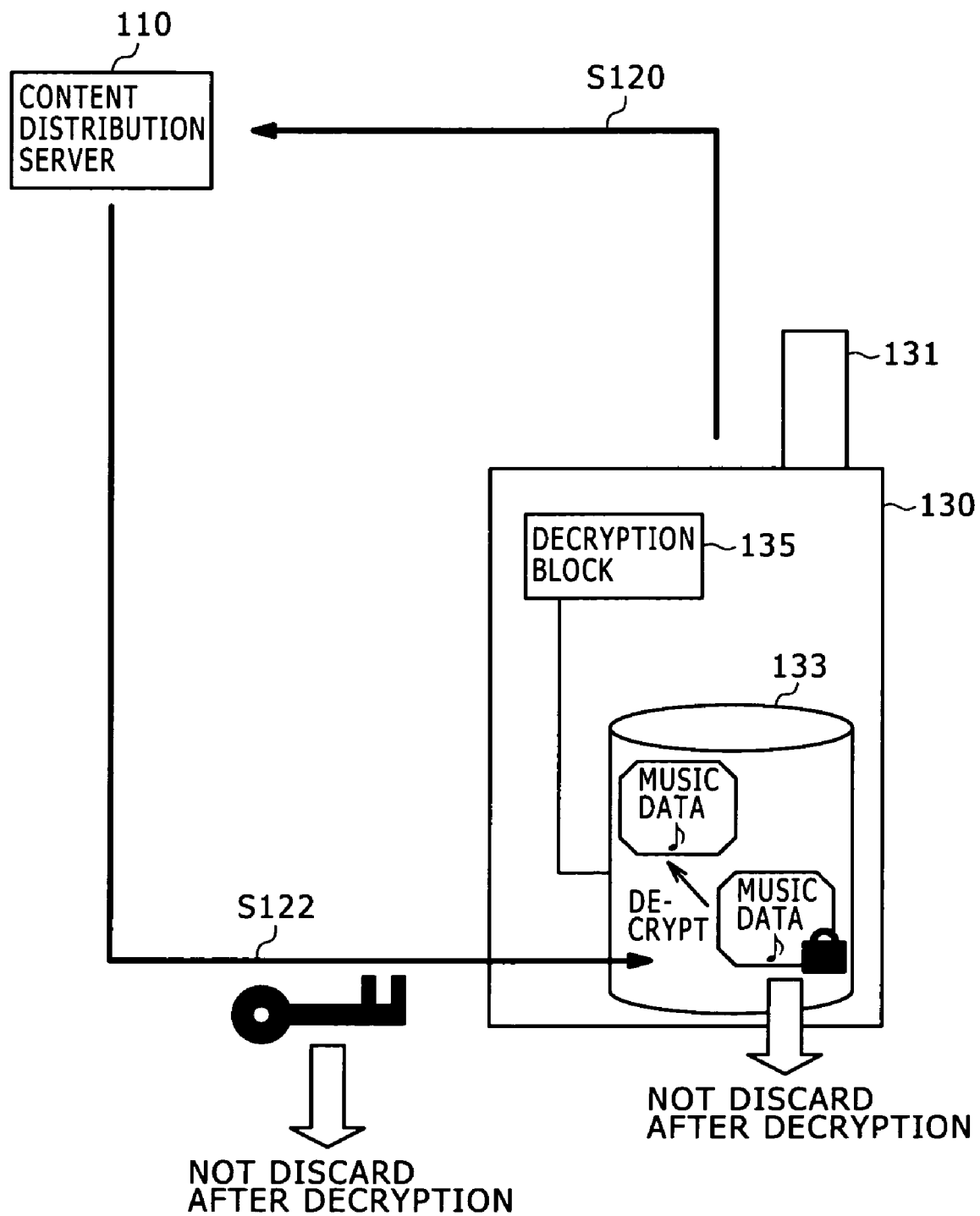
FIG. 12 is block diagram illustrating content purchase processing associated with the above-mentioned embodiment.

The following details the purchase procedure (steps S120 through S122) associated with the present embodiment with reference to FIG. 12. FIG. 12 is a block diagram showing the content purchase processing associated with the present embodiment.

As shown in FIG. 12, if the receiver terminal 130 that has deleted the decryption key desires to reproduce encrypted music data again and the sender terminal 120 that has transmitted that music data is not located inside the communicable range 200, the receiver terminal 130 accesses the content distribution server 110 via the Internet to request the purchase of the decryption key for decrypting the music data to be reproduced (step S120). At this moment, as described above, the receiver terminal 130 transmits, along with the purchase request, the ID of the sender terminal 120 that has transmitted the music data associated with the purchase request and the ID for identifying the encrypted music data.

Next, in response to the purchase request by the receiver terminal 130, the content distribution server 110 transmits the decryption key to the receiver terminal 130 via the Internet (step S122). Thus, the decryption key obtained through the purchase procedure is stored undeleted after use. The encrypted music data is also stored undeleted (because the fee has been paid for the purchase, there is no copyright problem). Storing thus the decryption key and the encrypted music data allows the receiver terminal 130 to reproduce the above-mentioned encrypted music data any time and, with respect the music data associated with purchase, play the same role of the sender terminal 120. Consequently, the content distribution method associated with the present embodiment enables the content distribution of P2P type, thereby providing efficient content distribution.

As shown in the above-mentioned variation to the present embodiment (with reference to FIG. 11), the receiver terminal 130 can obtain prepaid information beforehand, thereby purchasing music data without purchasing a decryption key from the content distribution server 110. Therefore, according to the content distribution method associated with the present embodiment, obtaining prepaid information beforehand allows the purchase of content through the wireless transmission/reception of data as far as the sender terminal 120 is located inside the communicable range 200 if there is no network connectivity and therefore the connection to the content distribution server 110 is disabled.

It should be noted that notifying the content distribution server 110 of the purchased content (by transmitting purchase log information) when updating the above-mentioned prepaid information for the content distribution server 110 allows the content distribution server 110 to know the content purchased by the receiver terminal 130.

The encrypted data, the purchased data, and the data created by the user (or the sender or receiver terminal) are stored separately. If the storage area runs short, the temporary data that is transferred in a wireless communication manner is low in priority and therefore automatically or manually deleted (the user can choose automatic deletion or manual deletion). For the method of deletion, LRU (Least Recently Used) is available, for example.

If the receiver terminal 130 has not obtained by decryption key for encrypted music data, the receiver terminal 130 holds only the encrypted music data. In this case, as with the music data associated with the purchase, the receiver terminal 130 can also play the role of the sender terminal and transmit that encrypted music data to another receiver terminal. However, because the receiver terminal 130 has no decryption key in this case, the receiver terminal 130 cannot transmit the decryption key to another sender terminal. The transmission of encrypted data by a terminal having no decryption key for decrypting that encrypted data to another terminal is herein referred to as "multi-stage transmission".

Figure 13:
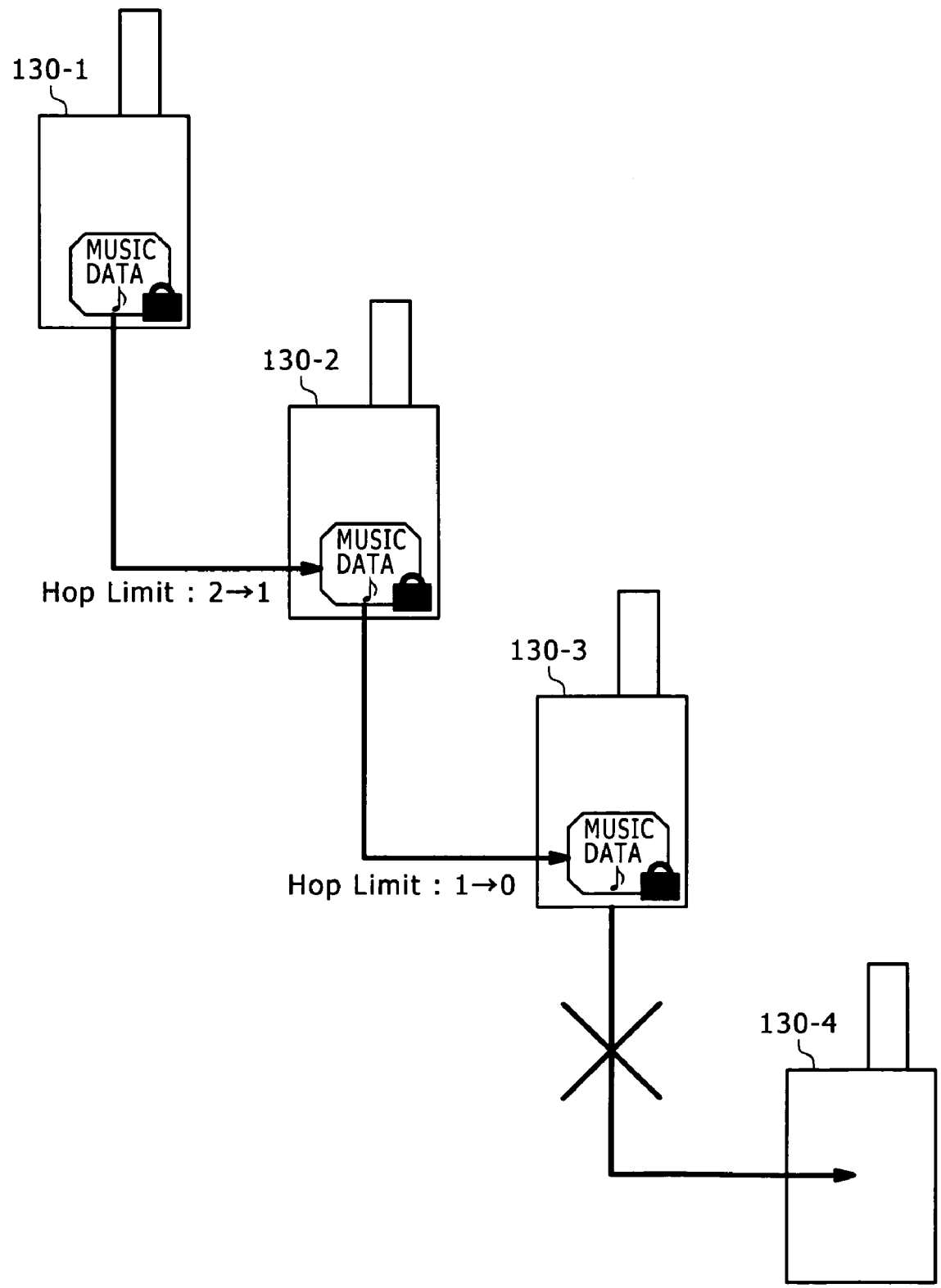
FIG. 13 is a diagram conceptually illustrating content multi-stage transmission associated with the above-mentioned embodiment.

The following describes the above-mentioned multi-stage transmission of content associated with the present embodiment. FIG. 13 schematically shows this multi-stage transmission.

As shown in FIG. 13, a first receiver terminal 130-1 has only encrypted data and no decryption key. The first receiver terminal 130-1 can transmit the encrypted data held therein to a second receiver terminal 130-2. It should be noted that, the transmission of encrypted data without restriction in the multi-stage transmission may cause copyright problems, so that each piece of encrypted content contains a limit counter for limiting the number of times the transmission of encrypted content to other receiver terminals is allowed.

For this limit counter, for example, a hop limit capability is available. The hop limit capability limits the number of times multi-stage transmission can be executed. The first receiver terminal 130-1 sets a particular initial value to each piece of music data as hop limit. Every time content is multi-stage transmitted, the value of hop limit is decremented. When the value reaches zero, no more multi-stage transmission is executed. FIG. 13 shows an example in which the hop limit value is set to two. When multi-stage transmission from the first receiver terminal 130-1 to the second receiver terminal 130-2 has been executed, the hop limit value is decremented by one. When multi-stage transmission has further been executed to a third receiver terminal 130-3, the hop limit value is decremented by one to zero. Then, no further multi-stage transmission to yet another receiver terminal 130-4 is allowed.

While preferred embodiments of the present invention have been described using specific terms, such description is for illustrative purpose only, and it is to be understood that changes and variations may be made without departing from the spirit or scope of the following claims.

For example, in the above-mentioned embodiments of the present invention, even if the receiver terminal 130 and the sender terminal 120 are located inside the communicable range 200, the decrypted content and the decryption key used for decryption are automatically deleted. However, the embodiments of the present invention are not limited to this configuration; for example, as far as the receiver terminal 130 and the sender terminal 120 are located inside the communicable range 200, the decrypted content and the decryption key may be reusable any number of times without deletion.

In the above-mentioned embodiments of the present invention, one piece of music data is provided for one transmission request in the transmission/reception of music data between the sender terminal 120 and receiver terminal 130; however, the embodiments of the present invention are not limited to this configuration. For example, a play list described below may be transmitted. To be more specific, the sender terminal holds a play list specifying a music title sequence and the music data entered in this play list. The receiver terminal requests the sender terminal for the transmission of this play list and receives the requested play list and the music data entered in this play list. When the receiver terminal reproduces the received play list, music is played in the registered sequence. Transmitting and receiving a play list as described above allow the sender terminal to alternately arrange audio files containing comments and the music data, thereby carrying out advertisement activities to effectively promote the sale of music data.

The embodiments of the present invention are applicable to a content distribution system and a content distribution method and, more particularly, to a content distribution system and a content distribution method that are capable of efficiently distributing content.

It should be understood by those skilled in the art that various modifications, combinations, sub-combinations and alterations may occur depending on design requirements and other factors insofar as they are within the scope of the appended claims or the equivalents thereof.

What is claimed is:

1. A content distribution system comprising:
   a content distribution server configured to distribute content;
   a sender terminal configured to distribute content held in said content distribution server on behalf of said content distribution server, wherein the sender terminal is connected with the content distribution server via a network; and
   a receiver terminal configured to receive said content from said sender terminal via a wireless communication network, wherein said content distribution server includes:
      a communication block configured to communicate with said sender terminal;
      a recording block configured to record content;
      a content management block configured to manage use of the content;
      a content encryption block configured to generate encrypted content by attaching a content reproduction restrictive condition to the piece of content; and
      a key management block configured to manage a decryption key for decrypting said encrypted content,
   wherein said sender terminal includes:
      a communication block configured to communicate with said content distribution server;
      a terminal detection block configured to detect whether said receiver terminal is located inside a communicable range in which said sender terminal and said receiver terminal communicate via the wireless communication network;
      a recording block including a cache and configured to record said encrypted content and said decryption key received from said content distribution server by relating said encrypted content with said decryption key; and
      an extraction block configured to extract part of said encrypted content and said decryption key related with said encrypted content,
   wherein said receiver terminal includes:
      a terminal detection block configured to detect whether said sender terminal is located inside said communicable range;
      a recording block configured to record said encrypted content and said decryption key received from said sender terminal by relating said encrypted content with said decryption key;
      a decryption block configured to decrypt said encrypted content recorded in said recording block by using the received decryption key; and
      a content reproduction block configured to reproduce said decrypted content,
   wherein, when said sender terminal is located inside the communicable range with said receiver terminal, said sender terminal uses the cache to distribute said content to the receiver via the wireless network and independent of the connection with the content distribution server, and said receiver terminal receives and reproduces said decrypted content even if the connection between the sender terminal and the content distribution server is disconnected, and
   wherein a determination is made based on availability of additional information and after decrypting the encrypted content, a result of the determination indicating to delete the decryption key received by the receiver terminal when the additional information is not available, and the result of the determination indicating to retain the decryption key when the additional information is available.

2. The content distribution system according to claim 1, wherein said decrypted key received by said receiver terminal from said sender terminal is a temporary key, and said receiver terminal deletes said decrypted content after reproducing the decrypted content based on the result of the determination.

3. The content distribution system according to claim 2, wherein the sender terminal sends terminal identification information and information associated with said content distribution server to said receiver terminal.

4. The content distribution system according to claim 3, wherein said receiver terminal transmits a purchase request to said content distribution server for purchasing said encrypted content on the basis of said information associated with said content distribution server after reproducing the decrypted content, and transmits encrypted content identification information for identifying said encrypted content associated with said purchase request and said sender terminal identification information.

5. The content distribution system according to claim 4, wherein the content distribution server transmits a decryption key for decrypting said encrypted content associated with said purchase request to said receiver terminal on the basis of said encrypted content identification information and said sender terminal identification information.

6. The content distribution system according to claim 5, wherein the content distribution server executes fee payment processing for said distribution of content executed on behalf of said content distribution server based on the encrypted content identification information and said sender terminal identification information.

7. The content distribution system according to claim 1, wherein the receiver terminal obtains the additional information as prepaid information for purchasing content in a predetermined number from said content distribution server and records the obtained prepaid information in said recording block of said receiver terminal.

8. The content distribution system according to claim 7, wherein said receiver terminal determines whether said prepaid information is recorded in said recording block and relates said prepaid information with said encrypted content when the prepaid information is determined to be recorded.

9. The content distribution system according to claim 8, wherein said receiver terminal transmits purchase log information containing encrypted content identification information associated with encrypted content related with said prepaid information and sender terminal identification information to the content distribution server, and the content distribution server executes fee payment processing for said distribution of content based on the purchase log information.

10. A content distribution server comprising:
a recording block configured to record content;
a content management block configured to manage use of the content;
a content encryption block configured to generate encrypted content by attaching a content reproduction restrictive condition to a piece of content;
a key management block configured to manage a decryption key for decrypting said encrypted content;
a fee processing block configured to process fee payment based on content transmitted to a sender terminal;
a terminal management block configured to associate an identifier of the sender terminal with an identifier of the encrypted content; and
a communication block configured to:
receive a request to register the sender terminal, the request including registration information corresponding to the sender terminal;
receive a request for the piece of content from the sender terminal after registration of the sender terminal; and
transmit the encrypted content and the decryption key for storing in a cache of the sender terminal, wherein when said sender terminal is located inside a communicable range with a receiver terminal, said sender terminal uses the cache to distribute said content to the receiver via a wireless network and independent of a connection with the content distribution server, and said receiver terminal receives and reproduces said decrypted content even if the connection between the sender terminal and the content distribution server is disconnected, and
wherein a determination is made based on availability of additional information and after decrypting the encrypted content, a result of the determination indicating to delete the transmitted decryption key when the additional information is not available, and the result of the determination indicating to retain the transmitted decryption key when the additional information is available.

11. A sender terminal for distributing content held in a content distribution server connected to the sender terminal via a network, the sender terminal comprising:
a terminal detection block configured to detect whether a receiver terminal is located inside a communicable range in which said sender terminal and said receiver terminal communicate via the wireless communication network;
a recording block including a cache and configured to record encrypted content and a decryption key received from said content distribution server by relating said encrypted content with said decryption key;
a content management block configured to manage use of content included in the recording block;
a content encryption block configured to encrypt unencrypted content received from the content distribution server;
a key management block configured to manage the decryption key recorded in the recording block by associating a decryption key identifier with an identifier of the encrypted content;
an extraction block configured to extract part of said encrypted content and said decryption key related with said encrypted content; and
a communication block configured to:
send a request for registration of the sender terminal with the content distribution server;
receive the encrypted content and the decryption key from the content distribution server after registration of the sender terminal, wherein the encrypted content is stored in the cache; and
transmit the encrypted content and the decryption key to the receiver terminal, wherein when said receiver terminal is determined to be inside the communicable range, said sender terminal uses the cache to distribute said content to the receiver terminal via a wireless network and independent of a connection between the sender terminal and the content distribution server, and said encrypted content and the decryption key is transmitted even if the connection between the sender terminal and the content distribution server is disconnected,
wherein a determination is made based on availability of additional information and after decrypting the encrypted content, a result of the determination indicating to delete the transmitted decryption key when the additional information is not available, and the result of the determination indicating to retain the transmitted decryption key when the additional information is available.

12. A receiver terminal for receiving content from a sender terminal via a wireless communication network, the sender terminal receiving the content from a content distribution server, the receiver terminal comprising:
a terminal detection block configured to detect whether said sender terminal is located inside a communicable range;
a recording block configured to record encrypted content and a decryption key received from a cache of the sender terminal by relating said encrypted content with said decryption key;

a decryption block configured to decrypt said encrypted content recorded in said recording block by using the received decryption key;

a content management block configured to manage use of content included in the recording block; and a key management block configured to manage the decryption key recorded in the recording block by associating a decryption key identifier with an identifier of the encrypted content;

an extraction block configured to extract part of said encrypted content and said decryption key related with said encrypted content;

a content reproduction block configured to reproduce said decrypted content; and a communication block configured to:

send a request for a piece of content recorded in a cache of the sender terminal;

receive the piece of content as the encrypted content; and receive the decryption key to decrypt the encrypted content, wherein when said sender terminal is determined to be inside the communicable range, said encrypted content and decryption is received from the cache of the sender terminal independent of a connection with between the content distribution server and the sender terminal, and the encrypted content and the decryption key is received even if the connection between the sender terminal and the content distribution server is disconnected, wherein a determination is made based on availability of additional information and after decrypting the encrypted content, a result of the determination indicating to delete the received decryption key when the additional information is not available, and the result of the determination indicating to retain the received decryption key when the additional information is available.

* * * * *